United States Patent
Ran et al.

(10) Patent No.: US 12,043,288 B2
(45) Date of Patent: Jul. 23, 2024

(54) MOBILE INTELLIGENT ROAD INFRASTRUCTURE SYSTEM

(71) Applicant: CAVH LLC, Fitchburg, WI (US)

(72) Inventors: Bin Ran, Fitchburg, WI (US); Wenqi Lu, Madison, WI (US); Tianyi Chen, Madison, WI (US); Yang Cheng, Middleton, WI (US); Linheng Li, Madison, WI (US); Bingjie Liang, Madison, WI (US); Yifan Yao, Madison, WI (US); Kunsong Shi, Madison, WI (US); Keshu Wu, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 317 days.

(21) Appl. No.: 17/674,925

(22) Filed: Feb. 18, 2022

(65) Prior Publication Data
US 2022/0281484 A1    Sep. 8, 2022

Related U.S. Application Data

(60) Provisional application No. 63/155,545, filed on Mar. 2, 2021.

(51) Int. Cl.
*B60W 60/00* (2020.01)
*B60W 40/09* (2012.01)
*B60W 40/105* (2012.01)
*H04W 4/44* (2018.01)

(52) U.S. Cl.
CPC ...... *B60W 60/00184* (2020.02); *B60W 40/09* (2013.01); *B60W 40/105* (2013.01); *H04W 4/44* (2018.02)

(58) Field of Classification Search
CPC .......... B60W 60/00184; B60W 40/09; B60W 40/105; H04W 4/44
See application file for complete search history.

(56) References Cited

U.S. PATENT DOCUMENTS

| 10,380,886 B2 | 8/2019 | Ran et al. | |
| 10,692,365 B2 | 6/2020 | Ran et al. | |
| 10,867,512 B2 | 12/2020 | Ran et al. | |
| 2016/0012722 A1* | 1/2016 | Filali | G08G 1/052 701/118 |

(Continued)

FOREIGN PATENT DOCUMENTS

| WO | WO-2020014131 A1 * | 1/2020 | ............. E01F 15/02 |
| WO | WO 2021/262367 | 12/2021 | |

OTHER PUBLICATIONS

SAE International Standard J3016, "Taxonomy and Definitions for Terms Related to Driving Automation Systems for On-Road Motor Vehicles" (as revised in 2016 (J3016_201609)) Retrieved from the internet Dec. 12, 2016. 30 pages.

(Continued)

*Primary Examiner* — Ryan W Sherwin
(74) *Attorney, Agent, or Firm* — Casimir Jones, S.C.; Thomas A. Isenbarger

(57) ABSTRACT

Provided herein is technology relating to automated driving and particularly, but not exclusively, to a mobile intelligent road infrastructure technology configured to serve automated driving systems by providing, supplementing, and/or enhancing autonomous driving functions for connected automated vehicles under common and unusual driving scenarios.

14 Claims, 12 Drawing Sheets

(56) References Cited

U.S. PATENT DOCUMENTS

| | | | |
|---|---|---|---|
| 2018/0376305 A1* | 12/2018 | Ramalho de Oliveira | ................. H04W 4/44 |
| 2019/0340921 A1 | 11/2019 | Ran et al. | |
| 2020/0005633 A1 | 1/2020 | Jin et al. | |
| 2020/0021961 A1 | 1/2020 | Li et al. | |
| 2020/0168081 A1 | 5/2020 | Ran et al. | |
| 2020/0312142 A1* | 10/2020 | Su | G05D 1/0285 |
| 2020/0334978 A1* | 10/2020 | Pittman | G08G 1/0112 |
| 2021/0065547 A1 | 3/2021 | Ran et al. | |
| 2021/0209937 A1* | 7/2021 | Eilertsen | H04W 4/023 |
| 2021/0304607 A1* | 9/2021 | Grace | G08G 1/166 |
| 2021/0311491 A1 | 10/2021 | Li et al. | |
| 2021/0314752 A1 | 10/2021 | Ran et al. | |
| 2021/0394797 A1 | 12/2021 | Ran et al. | |
| 2022/0139209 A1* | 5/2022 | Biala | H04L 67/60 701/1 |
| 2023/0008967 A1* | 1/2023 | Iun | G08G 1/0141 |
| 2023/0080784 A1* | 3/2023 | Okayama | G08G 1/082 340/907 |

OTHER PUBLICATIONS

SAE International Standard J3016, "Taxonomy and Definitions for Terms Related to Driving Automation Systems for On-Road Motor Vehicles". (as revised in 2018 (J3016_201806)) Retrieved from the internet Feb. 3, 2023. 35 pages.

SAE International Standard J3016, SAE International Standard J3016, "Taxonomy and Definitions for Terms Related to Driving Automation Systems for On-Road Motor Vehicles" (published in 2014 (J3016_201401)) Retrieved from the internet Sep. 17, 2019. 12 pages.

* cited by examiner

MOBILE INTELLIGENT ROAD INFRASTRUCTURE SYSTEM

STATEMENT OF RELATED APPLICATIONS

This application claims priority to U.S. Provisional Patent Application No. 63/155,545, filed Mar. 2, 2021, the entire contents of which are incorporated herein by reference for all purposes.

FIELD

Provided herein is technology relating to automated driving and particularly, but not exclusively, to a mobile intelligent road infrastructure technology configured to serve automated driving systems by providing, supplementing, and/or enhancing autonomous driving functions for connected automated vehicles under common and unusual driving scenarios.

BACKGROUND

With the development of new-generation information technologies such as artificial intelligence, cloud computing, and the Internet of Things, the development of transportation infrastructure is facing new opportunities and new challenges. For example, a connected and automated vehicle highway system (CAVH) provides important technologies for alleviating traffic congestion, improving traffic safety, and reducing traffic pollution. See, e.g., U.S. Pat. No. 10,380,886 and U.S. Pat. App. Pub. No. 2019/0340921, each of which is incorporated herein by reference.

An intelligent roadside system provides collaborative sensing, collaborative prediction, collaborative decision-making, and collaborative vehicle control for CAVH systems. While existing intelligent roadside systems typically comprise fixed, immobile infrastructure components (see, e.g., U.S. Pat. No. 10,692,365 and U.S. Pat. App. Pub. No. 2020/0168081, each of which is incorporated herein by reference), automated driving systems (e.g., CAVH systems) would benefit from mobile intelligent roadside infrastructure technologies.

SUMMARY

Accordingly, provided herein is a mobile intelligent roadside infrastructure technology. In particular, the technology provides a Mobile Intelligent Road Infrastructure System (MIRIS) and related methods (e.g., management methods) that serve automated driving systems (ADS), such as a connected and automated vehicle highway (CAVH) system. The MIRIS and related methods provide, supplement, enhance, exceed, improve, and/or replace macroscopic, mesoscopic, and/or microscopic automated driving functions (e.g., sensing, prediction, decision-making, and/or control) for connected automated vehicles (CAV) at any vehicle intelligence level. In some embodiments, the MIRIS improves an ADS by providing dynamic characteristics, flexibility, and increased capabilities to an ADS. For example, an ADS (e.g., a CAVH system) improved by the MIRIS is configured to adjust and/or deploy mobile roadside infrastructure (e.g., components and/or equipment) flexibly and quickly to provide automated driving functions. Embodiments of the MIRIS technology provided herein enhance ADS (e.g., CAVH systems) and components of ADS systems (e.g., CAVH system components) by providing mobile infrastructure and systems and methods for managing mobile infrastructure. The MIRIS also improves an ADS by assisting the ADS to manage emergency scenarios and long-tail scenarios of automated driving.

As described herein, embodiments of the MIRIS comprise: (1) a Mobile Roadside Intelligent Unit (MRIU); (2) a Traffic Operation Center (TOC); (3) a Traffic Control Center (TCC) and Traffic Control Unit (TCU); and/or (4) a roadside communication system. Further, in some embodiments, the MIRIS (e.g., a TOC of the MIRIS) comprises a Roadside Unit Management Control (RUMC) system that determines locations for MRIU and/or adjusts the location of MRIU. For example, in some embodiments, the RUMC system adjusts the location of MRIU to provide the MIRIS with functions to enhance the service capabilities of ADS (e.g., CAVH system), replace a faulty roadside intelligent unit (RIU), and/or assist site selection for an RIU. Consequently, the MIRIS improves the reliability, mobility, and/or serviceability of an ADS (e.g., a CAVH system).

Accordingly, the MIRIS technology supplements and complements previous ADS (e.g., CAVH systems) comprising fixed infrastructure. For example, the MIRIS technology provides an ADS (e.g., CAVH system) with dynamic and flexible infrastructure, functions, and/or capabilities to control vehicles and manage traffic in a broader range of scenarios, e.g., long-tail environments and scenarios. As described herein, mobile roadside intelligent units are organized and controlled by the MIRIS (e.g., by a TOC) to enhance the practicability, flexibility, and reliability of ADS (e.g., CAVH systems). The technology provided herein thus provides ADS (e.g., CAVH systems) with functions and/or capabilities to control vehicles and manage traffic in a variety of complex scenarios and to improve the safety and reliability of autonomous driving. Moreover, in some embodiments, the MIRIS improves the efficiency of infrastructure deployment and increases the effectiveness and implementation of automated driving systems (e.g., a CAVH system).

Accordingly, provided herein is technology related to a Mobile Intelligent Road Infrastructure System (MIRIS). In some embodiments, the MIRIS comprises one or more of the following subcomponents: a Mobile Roadside Intelligent Unit (MRIU); Traffic Operation Center (TOC); Traffic Control Center (TCC) and Traffic Control Unit (TCU); and/or a roadside communication system. In some embodiments, one or more of the subcomponents is a physical subsystem. Accordingly, in some embodiments, the MIRIS comprises one or more of the following physical subsystems: a Mobile Roadside Intelligent Unit (MRIU); Traffic Operation Center (TOC); Traffic Control Center (TCC) and Traffic Control Unit (TCU); and/or a roadside communication system. In some embodiments, the MIRIS is configured to support an automated driving system (ADS). In some embodiments, the MIRIS is configured to support a connected and automated vehicle highway (CAVH) system. In some embodiments, the MIRIS is configured to support an ADS by providing one or more mobile roadside intelligent units (MRIU) to said ADS.

In some embodiments, the MIRIS is supported by a multi-level cloud platform, a high-precision map system, an energy supply system, and/or an information security system. In some embodiments, an ADS and/or a CAVH system comprises said multi-level cloud platform, said high-precision map system, said energy supply system, and/or said information security system. In some embodiments, the ADS is a road-based ADS, a connected and automated vehicle (CAV)-based ADS, a cloud-based ADS, and/or a high precision map-based ADS.

In some embodiments, the MIRIS is configured to serve automated vehicles (AV) and/or connected and automated vehicles (CAV) having an intelligence level of V1, V1.5, V2, V3, V4, and/or V5. In some embodiments, the MIRIS is configured to receive data from a Vehicle Intelligent Unit (VIU) and/or an MRIU, generate vehicle control instructions, and/or send vehicle control instructions to a VIU. In some embodiments, the MIRIS is configured to complement, enhance, back-up, elevate, and/or replace automated driving functions provided by an ADS and/or CAVH system.

In some embodiments, the MIRIS "complements" the automated driving functions of an ADS (e.g., CAVH system), IRIS, and/or a vehicle by providing sensing and perception, decision-making, and/or vehicle control functions for an ADS (e.g., CAVH system), IRIS, and/or a vehicle that is not able to perform one or more of sensing and perception, decision-making, and/or vehicle control functions. Accordingly, in some embodiments, the MIRIS "completes" the suite of automated driving functions by providing the automated driving functions that are not provided by the vehicle or that are not adequately provided by the ADS (e.g., CAVH system), IRIS, and/or a vehicle.

In some embodiments, the MIRIS "enhances" the automated driving functions of an ADS (e.g., CAVH system), IRIS, and/or a vehicle by improving the vehicle driving functions provided by the ADS (e.g., CAVH system), IRIS, and/or a vehicle. For example, in some embodiments, the MIRIS enhances automated driving functions of an ADS (e.g., CAVH system), IRIS, and/or a vehicle by improving sensing and perception, decision-making, and/or vehicle control functions for an ADS (e.g., CAVH system), IRIS, and/or a vehicle that is not adequately performing sensing and perception, decision-making, and/or vehicle control functions.

In some embodiments, the MIRIS "backs-up" the automated driving functions of an ADS (e.g., CAVH system), IRIS, and/or a vehicle by providing system redundancies configured to provide sensing and perception, decision-making, and/or vehicle control functions to a vehicle when an ADS (e.g., CAVH system), IRIS, and/or a vehicle experiences a failure that decreases the sensing and perception, decision-making, and/or vehicle control functions of the an ADS (e.g., CAVH system), IRIS, and/or a vehicle.

In some embodiments, the MIRIS "elevates" a vehicle intelligence level from a lower vehicle intelligence level to a higher vehicle intelligence level. In some embodiments, the MIRIS elevates a vehicle automation level from a lower vehicle automation level to a higher vehicle automation level, where the vehicle automation level is as described herein and/or as defined by SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806), each of which is incorporated herein by reference.

In some embodiments, the MIRIS "replaces" the automated driving functions of an ADS (e.g., CAVH system), IRIS, and/or a vehicle by fully and/or partially replacing the vehicle driving functions provided by an ADS (e.g., CAVH system), IRIS, and/or a vehicle with vehicle driving functions provided by the MIRIS. For example, in some embodiments, the MIRIS fully and/or partially replaces one or more automated driving functions of an ADS (e.g., CAVH system), IRIS, and/or a vehicle by fully and/or partially replacing sensing and perception, decision-making, and/or vehicle control functions for an ADS (e.g., CAVH system), IRIS, and/or a vehicle that is not performing sensing and perception, decision-making, and/or vehicle control functions and/or for an ADS (e.g., CAVH system), IRIS, and/or a vehicle that is not adequately and/or not fully performing sensing and perception, decision-making, and/or vehicle control functions. In some embodiments, the MIRIS "replaces" the automated driving functions of an ADS (e.g., CAVH system), IRIS, and/or a vehicle by fully and/or partially replacing the vehicle driving functions provided by an ADS (e.g., CAVH system), IRIS, and/or a vehicle with vehicle driving functions provided by the MIRIS during an emergency situation and/or in a long-tail scenario.

In some embodiments, the MIRIS is configured to provide sensing, prediction, decision-making, and/or vehicle control functions for automated driving. In some embodiments, the automated driving functions are sensing, prediction, decision-making, and/or vehicle control functions.

In some embodiments, the MIRIS is configured to perform MRIU management and control methods comprising supporting IRIS by deploying an MRIU to said IRIS. In some embodiments, the MRIU provides sensing, prediction, decision-making, and/or vehicle control functions to IRIS. In some embodiments, the MRIU performs the management and control methods when an RIU malfunctions, an RIU is failing, an RIU is unable to adequately provide and/or support automated driving functions, and/or when IRIS has no RIU deployed at a location where automated driving services are needed.

In some embodiments, the MIRIS further comprises a Roadside Unit Management Control (RUMC) system. In some embodiments, the RUMC system is configured to perform methods comprising optimizing RIU deployment locations. In some embodiments, the RUMC system is further configured to perform methods comprising deploying an MRIU. In some embodiments, the MRIU is configured to collect IRIS and/or RIU performance data. In some embodiments, the performance data describes sensing and detection functions of said IRIS and/or said RIU. In some embodiments, the RUMC system is configured to perform methods comprising identifying optimal deployment locations. In some embodiments, the RUMC system is configured to perform methods comprising deploying an MRIU to an optimal deployment location. In some embodiments, the RUMC is configured to perform methods comprising deploying a number of MRIU to IRIS; collecting IRIS performance data describing sensing and detection functions of IRIS; and/or identifying optimal locations for RIU based on said IRIS performance data. In some embodiments, the RUMC system is configured to perform methods comprising communicating said optimal locations for RIU to IRIS; and/or deploying MRIU to IRIS. In some embodiments, the MRIU are deployed at said optimal locations.

In some embodiments, the TOC is configured to predict traffic state, manage traffic, plan traffic, and/or make decisions. In some embodiments, the TOC is configured to predict traffic state on a mesoscopic and/or macroscopic time scale. In some embodiments, the TOC is configured to interact with and/or receive support from a multi-level cloud platform. In some embodiments, the TOC is configured to provide vehicle control and traffic management strategies, adjust a position of an MRIU, and/or provide automated driving functions. In some embodiments, the TOC is configured to provide functions through a RUMC system of MIRIS. In some embodiments, the TOC is configured to receive data describing real-time traffic status and/or real-time demand for ADS services; and/or provide automated driving functions based on said data. In some embodiments, the TOC is configured to determine real-time traffic status and/or real-time demand for ADS services; and/or provide automated driving functions based on said real-time traffic status and/or demand for ADS services. In some embodiments, the TOC is configured to provide automated driving functions for a number of different automated driving scenarios.

In some embodiments, the MRIU is/are configured to exchange data and/or information with RIU, TCU, TCC, TOC, and/or VIU.

In some embodiments, the roadside communication system is configured to provide wired and/or wireless communications between MIRIS subcomponents. In some embodiments, the roadside communication system is configured to provide wired and/or wireless communications for exchange of data and/or information. In some embodiments, the roadside communication system is configured to provide wired and/or wireless communications using LTE-V2X, 4G, 5G, 6G, and/or 7G cellular.

In some embodiments, the multi-level cloud platform comprises and/or provides a macroscopic cloud, a mesoscopic cloud, and/or a microscopic cloud. In some embodiments, the multi-level cloud platform comprises a macroscopic cloud configured to provide (and/or to provide support for) computing and/or data storage functions for TOC; a mesoscopic cloud configured to provide (and/or to provide support for) computing and/or data storage functions for TCC; and/or a microscopic cloud configured to provide (and/or to provide support for) computing and/or data storage functions for TCU. Additional discussion of the multi-level cloud platform and the macroscopic cloud, a mesoscopic cloud, and/or microscopic cloud is provided by, e.g., U.S. Pat. App. Ser. No. 63/149,804, incorporated herein by reference.

In some embodiments, the high-precision map system is configured to provide positioning and mapping services for the MRIU and/or for a RUMC system.

In some embodiments, the energy supply system is configured to provide power for the operations of MIRIS and/or for the component subsystems of the MIRIS.

In some embodiments, the information security system is configured to maximize communication security and/or information storage security of the MIRIS and/or for the component subsystems of the MIRIS.

In some embodiments, the RUMC system comprises an information transmission subsystem, a data management subsystem, a mobile service subsystem, and/or a security control subsystem. In some embodiments, the information transmission subsystem is configured to exchange data and/or information with the RUMC system, MRIU, and/or IRIS. In some embodiments, the data management subsystem is configured to record, store, and/or back-up data and/or information from MRIU. In some embodiments, the data and/or information from MRIU comprises MRIU position, MRIU state, MRIU energy consumption, scene environment information, real-time sensing data, and/or historical MRIU movement plans. In some embodiments, the mobile service subsystem is configured to analyze a scene and/or parameters recorded in the data management subsystem; formulate a MRIU deployment plan; and/or generate MRIU control strategies for adjusting a location of an MRIU. In some embodiments, the mobile service subsystem is further configured to provide a mobile command comprising control instructions for adjusting the position of a MRIU. In some embodiments, the mobile command is provided to said security control subsystem. In some embodiments, the security control subsystem is configured to confirm a mobile command provided by the mobile service subsystem; and send the mobile command to the information transmission subsystem for execution of said mobile command. In some embodiments, execution of said mobile command comprises performing a method comprising adjusting a position of a MRIU.

In some embodiments, the RUMC system is configured to perform a method comprising receiving, e.g., by the information transmission subsystem, a service request sent by the IRIS or the MRIU; optionally backing up, e.g., by the data management subsystem, the service request; analyzing, e.g., by the mobile service subsystem, the specific working scenario of the service request; determining, e.g., by the mobile service subsystem, if the MIRIS can provide services in the specific working scenario; and/or performing either (i) or (ii): (i) if the MIRIS cannot provide services in the specific working scenario: methods comprise generating, e.g., by the mobile service subsystem, a command that the MIRIS cannot meet the service requirements; transmitting the command to the information transmission subsystem; and sending, e.g., by the information transmission subsystem, the command to IRIS and/or MRIU indicating that MIRIS cannot meet the service requirements; or (ii) if the MIRIS can provide services in the specific working scenario: methods comprise selecting, e.g., by the mobile service subsystem, work modules according to the specific service requirements; generating a layout scheme and MRIU control instructions; confirming, e.g., by the safety control subsystem, the layout scheme and MRIU control instructions; and sending, e.g., by the information transmission subsystem, the layout scheme and MRIU control instructions to IRIS and/or MRIU.

In some embodiments, the mobile service subsystem comprises a dynamic deployment module, an emergency service module, and/or an auxiliary application module. In some embodiments, the dynamic deployment module is configured to perform a method comprising adjusting the location of MRIU to balance the ADS services and demands for ADS services. In some embodiments, the dynamic deployment module is configured to adjust the location of MRIU to balance the ADS services and demands for ADS services. In some embodiments, the dynamic deployment module is configured to adjust the location of MRIU to rebalance the ADS services and demands for ADS services after a change in traffic flow over time and/or in different geographic areas. In some embodiments, the emergency service module is configured to provide and/or support automated driving in long tail scenarios; generate MRIU management and/or control strategies in response to emergency scenarios; and/or supplement and/or enhance ADS sensing, prediction, decision-making, and/or vehicle control functions for long-tail and/or emergency scenarios. In some embodiments, auxiliary application module is configured to generate MRIU control strategies or schemes for other service requirements of the ADS.

In some embodiments, the MRIU comprises an intelligent sensing module; an intelligent communication module; an intelligent computing module; an intelligent decision control module; an intelligent mobile module; and/or an intelligent display module.

In some embodiments, the intelligent sensing module is configured to provide environment sensing to sense the environment and/or to provide mobile state sensing to sense the mobile state of an MRIU. In some embodiments, the environment sensing provides data describing the environment as an input for an ADS and/or CAVH system. In some embodiments, the mobile state sensing comprises use of a GNSS to sense the dynamic parameters of an MRIU, an inertial navigation system to sense the dynamic parameters of an MRIU, and/or other systems configured to sense the dynamic parameters of an MRIU. In some embodiments, the dynamic parameters of an MRIU provide information support for the movement of the MRIU. In some embodiments, the intelligent communication module is configured to provide and/or support multi-mode communication. In some embodiments, the multi-mode communication comprises use of LTE-V2X, WiFi, GPS/BeiDou, 5G, 6G, and/or 7G cellular communications. In some embodiments, the intelligent communication module is configured to provide and/or support low-delay, high-reliability, and/or high-density data exchange between MRIU and RIU, TCU, TCC, TOC, and/or VIU.

In some embodiments, the intelligent computing module is configured to provide data fusion, data storage, and/or data feature extraction for sensing data and/or multi-source sensing data; predict the traffic flow state; and/or and optimize the moving speed and/or moving path for an MRIU. In some embodiments, the intelligent computing module is configured to predict the traffic flow state on a microscopic time scale. In some embodiments, the intelligent computing module is configured to optimize the moving speed and/or moving path for an MRIU in real-time. In some embodiments, the intelligent computing module is configured to be supported by a component configured to provide edge computing technology. In some embodiments, the intelligent computing module is configured to formulate control strategies, generate vehicle control instructions, and/or distribute vehicle control information and/or instructions for CAV. In some embodiments, the CAV have an intelligence level of V1, V1.5, V2, V3, V4, or V5. In some embodiments, the intelligent computing module is configured to formulate control strategies, generate vehicle control instructions, and/or distribute vehicle control information and/or instructions for CAV using data processed by the intelligent computing module.

In some embodiments, the intelligent decision control module is configured to determine the moving speed and/or the moving path of an MRIU.

In some embodiments, the intelligent mobile module is configured to move an MRIU. In some embodiments, the intelligent mobile module is configured to move an MRIU according to a moving speed and/or a moving path determined and/or provided by the intelligent decision control module. In some embodiments, the intelligent mobile module is configured to monitor the movement status and/or energy consumption of a MRIU. In some embodiments, the intelligent mobile module is configured to monitor the movement status and/or energy consumption of a MRIU in real-time.

In some embodiments, the intelligent display module is configured to assist CAV. In some embodiments, the intelligent display module is configured to assist CAV at an intelligence level of V1, V1.5, V2, V3, V4, or V5. In some embodiments, the intelligent display module is configured to assist CAV having a VIU malfunction and/or VIU failure.

In some embodiments, the intelligent computing module comprises a data storage unit, an edge computing unit, and/or a route planning unit. In some embodiments, the data storage unit is configured to store traffic information collected by the intelligent sensing module; back up task instructions; and/or record the operating parameters of the MRIU. In some embodiments, the traffic information is processed by the multi-level cloud platform. In some embodiments, the task instructions are sent by the RUMC.

In some embodiments, the operating parameters of the MRIU comprise time, MRIU location, MRIU speed, and/or MRIU energy consumption.

In some embodiments, the edge computing unit is configured to conduct data fusion and/or data feature extraction for traffic information. In some embodiments, the traffic information is collected by the intelligent sensing module. In some embodiments, the edge computing unit is configured to combine mesoscopic traffic information and macroscopic traffic information. In some embodiments, the mesoscopic traffic information and/or macroscopic traffic information is provided by the multi-level cloud platform. In some embodiments, the edge computing unit is configured to predict lane traffic flow parameters and/or the movement state of CAV. In some embodiments, the lane traffic flow parameters and/or the movement state of CAV are on a microscopic and/or mesoscopic time scale. In some embodiments, the edge computing unit is configured to supplement the computing capacity of the ADS. In some embodiments, the edge computing unit is configured to identify, analyze, and/or predict a change of the external environment and/or a moving state of an MRIU.

In some embodiments, the route planning unit is configured to plan a moving path and/or a trajectory of MRIU. In some embodiments, the route planning unit is configured to optimize a moving speed of an MRIU according to information provided by the data storage unit and/or by the edge computing unit.

In some embodiments, the intelligent decision control module comprises a control unit, a decision-making unit, and/or a route selection unit. In some embodiments, the control unit is configured to generate control instructions for CAV. In some embodiments, the control unit is configured to generate control instructions for CAV having an intelligence level of V1, V1.5, V2, V3, V4, or V5. In some embodiments, the control unit is configured to maximize the safety control of CAV in special scenarios according to the information provided by the decision-making unit. In some embodiments, the decision-making unit is configured to provide and/or improve a decision-making function of CAV. In some embodiments, the decision-making unit is configured to provide and/or improve a decision-making function of CAV having an intelligence level of V1, V1.5, V2, V3, V4, or V5. In some embodiments, the decision-making unit is configured to provide and/or improve a decision-making function of CAV in a range of scenarios and/or to provide traffic management decisions for a range of scenarios. In some embodiments, the route selection unit is configured to determine a path for a MRIU. In some embodiments, the route selection unit is configured to determine a path for a MRIU according to a deployment task provided by the RUMC and/or according to a MRIU deployment scheme provided by the route planning unit. In some embodiments, the route selection unit is configured to determine if a planned path for a MRIU meets a service task assigned by the RUMC.

In some embodiments, the MRIU is configured to perform a method comprising receiving, e.g., by the intelligent communication module, a deployment command from the RUMC; planning, e.g., by the intelligent computing module, a moving path and/or a moving speed for MRIU; selecting, e.g., by the intelligent decision control module, a moving path and/or moving speed and sending the moving path and/or moving speed information to the intelligent mobile module; moving, e.g., by the intelligent mobile module, the MRIU according to the moving path and/or moving speed; and monitoring, e.g., by the intelligent mobile module, the movement status of the MRIU. In some embodiments, planning a moving path and/or a moving speed for MRIU comprises using and/or combining prediction information and/or attribute information of the MRIU. In some embodiments, the method comprises detecting, e.g., by the intelligent sensing module, obstacles in the moving path and/or abnormal conditions; and adjusting, e.g., by the intelligent computing module adjusts, the MRIU moving path based on real-time environment information and/or the operating parameters of the MRIU to provide a new path. In some embodiments, the method comprises determining, e.g., by the intelligent decision control module, if the MRIU can reach the target position on time according to the new path. In some embodiments, the method comprises determining, e.g., by the decision control module, that the MRIU cannot reach the task location on time according to the new path; and uploading task failure information to the RUMC. In some embodiments, the method further comprises waiting, e.g., by the MRIU, for further instructions from the RUMC. In some embodiments, the method comprises determining, e.g., by the decision control module, that the MRIU can reach the task location on time according to the new path; and moving, e.g., by the intelligent mobile module, the MRIU through the new path. In some embodiments, the method comprises confirming, e.g., by the intelligent decision control module, the moving path and/or moving speed. In some embodiments, monitoring the movement status of the MRIU is monitoring the movement status of the MRIU in real-time.

In some embodiments, the technology provides a mobile roadside intelligent unit (MRIU). In some embodiments, the MRIU comprises an intelligent sensing module; an intelligent communication module; an intelligent computing module; an intelligent decision control module; an intelligent mobile module; and/or an intelligent display module. In some embodiments, intelligent sensing module is configured to provide environment sensing to sense the environment and/or to provide mobile state sensing to sense the mobile state of an MRIU. In some embodiments, the environment sensing provides data describing the environment as an input for an ADS and/or CAVH system. In some embodiments, the mobile state sensing comprises use of a GNSS to sense the dynamic parameters of an MRIU, an inertial navigation system to sense the dynamic parameters of an MRIU, and/or other systems configured to sense the dynamic parameters of an MRIU. In some embodiments, the dynamic parameters of an MRIU provide information support for the movement of the MRIU. In some embodiments, the intelligent communication module is configured to provide and/or support multi-mode communication. In some embodiments, the multi-mode communication comprises use of LTE-V2X, WiFi, GPS/BeiDou, 5G, 6G, and/or 7G. In some embodiments, the intelligent communication module is configured to provide and/or support low-delay, high-reliability, and/or high-density data exchange between MRIU and RIU, TCU, TCC, TOC, and/or VIU. In some embodiments, the intelligent computing module is configured to provide data fusion, data storage, and/or data feature extraction for sensing data and/or multi-source sensing data; predict the traffic flow state; and/or and optimize the moving speed and/or moving path for an MRIU. In some embodiments, the computing module is configured to predict the traffic flow state on a microscopic time scale. In some embodiments, the intelligent computing module is configured to optimize the moving speed and/or moving path for an MRIU in real-time. In some embodiments, the intelligent computing module is configured to be supported by a component configured to provide edge computing technology. In some embodiments, the intelligent computing module is configured to formulate control strategies, generate vehicle control instructions, and/or distribute vehicle control information and/or instructions for CAV. In some embodiments, the CAV have an intelligence level of V1, V1.5, V2, V3, V4, or V5. In some embodiments, the intelligent computing module is configured to formulate control strategies, generate vehicle control instructions, and/or distribute vehicle control information and/or instructions for CAV using data processed by the intelligent computing module. In some embodiments, the intelligent decision control module is configured to determine the moving speed and/or the moving path of an MRIU. In some embodiments, the intelligent mobile module is configured to move an MRIU. In some embodiments, the intelligent mobile module is configured to move an MRIU according to a moving speed and/or a moving path determined and/or provided by the intelligent decision control module. In some embodiments, the intelligent mobile module is configured to monitor the movement status and/or energy consumption of a MRIU. In some embodiments, the intelligent mobile module is configured to monitor the movement status and/or energy consumption of a MRIU in real-time. In some embodiments, the intelligent display module is configured to assist CAV. In some embodiments, the intelligent display module is configured to assist CAV at an intelligence level of V1, V1.5, V2, V3, V4, or V5. In some embodiments, the intelligent display module is configured to assist CAV having a VIU malfunction and/or VIU failure. In some embodiments, the intelligent computing module comprises a data storage unit, an edge computing unit, and/or a route planning unit. In some embodiments, the data storage unit is configured to store traffic information collected by the intelligent sensing module; back up task instructions; and/or record the operating parameters of the MRIU. In some embodiments, the traffic information is processed by the multi-level cloud platform. In some embodiments, the task instructions are sent by the RUMC. In some embodiments, the operating parameters of the MRIU comprise time, MRIU location, MRIU speed, and/or MRIU energy consumption. In some embodiments, the edge computing unit is configured to conduct data fusion and/or data feature extraction for traffic information. In some embodiments, the traffic information is collected by the intelligent sensing module. In some embodiments, the edge computing unit is configured to combine mesoscopic traffic information and macroscopic traffic information. In some embodiments, the mesoscopic traffic information and/or macroscopic traffic information is provided by the multi-level cloud platform. In some embodiments, the edge computing unit is configured to predict lane traffic flow parameters and/or the movement state of CAV. In some embodiments, the lane traffic flow parameters and/or the movement state of CAV are on a microscopic and/or mesoscopic time scale. In some embodiments, the edge computing unit is configured to supplement the computing capacity of the ADS. In some embodiments, the edge computing unit is configured to identify, analyze, and/or predict a change of the external environment and/or a moving state of an MRIU. In some embodiments, the route planning unit is configured to plan a moving path and/or a trajectory of MRIU. In some embodiments, the route planning unit is configured to optimize a moving speed of an MRIU according to information provided by the data storage unit and/or by the edge computing unit. In some embodiments, the intelligent decision control module comprises a control unit, a decision-making unit, and/or a route selection unit. In some embodiments, the control unit is configured to generate control instructions for CAV. In some embodiments, the control unit is configured to generate vehicle control instructions for CAV having an intelligence level of V1, V1.5, V2, V3, V4, or V5. In some embodiments, the control unit is configured to maximize the safety control of CAV in special scenarios according to the information provided by the decision-making unit. In some embodiments, the decision-making unit is configured to provide and/or improve a decision-making function of CAV. In some embodiments, the decision-making unit is configured to provide and/or improve a decision-making function of CAV having an intelligence level of V1, V1.5, V2, V3, V4, or V5. In some embodiments, the decision-making unit is configured to provide and/or improve a decision-making function of CAV in a range of scenarios and/or to provide traffic management decisions for a range of scenarios. In some embodiments, the route selection unit is configured to determine a path for a MRIU. In some embodiments, the route selection unit is configured to determine a path for a MRIU according to a deployment task provided by the RUMC and/or according to a MRIU deployment scheme provided by the route planning unit. In some embodiments, the route selection unit is configured to determine if a planned path for a MRIU meets a service task assigned by the RUMC.

Also provided herein are methods employing any of the systems described herein for the management of one or more aspects of automated driving of a CAV and/or for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all steps, operations, or processes described.

In some embodiments, the technology provides a method of controlling vehicles and/or managing traffic comprising providing a MIRIS as described herein. In some embodiments, the technology provides a method of controlling vehicles and/or managing traffic comprising providing a MRIU as described herein. In some embodiments, the technology provides a method of supporting an ADS (e.g., a CAVH system) comprising providing a MIRIS as described herein and/or a MRIU as described herein.

For example, in some embodiments, methods comprise providing a Mobile Intelligent Roadside Infrastructure System (MIRIS) comprising a Mobile Roadside Intelligent Unit (MRIU); receiving, by an information transmission subsystem, a service request sent by an IRIS or a MRIU; analyzing, by a mobile service subsystem, the specific working scenario of the service request; determining, e.g., by the mobile service subsystem, if the MIRIS can provide services in the specific working scenario; and/or performing either (i) or (ii): i) if the MIRIS cannot provide services in the specific working scenario: generating, e.g., by the mobile service subsystem, a command that the MIRIS cannot meet the service requirements; transmitting the command to the information transmission subsystem; and sending, e.g., by the information transmission subsystem, the command to IRIS and/or MRIU indicating that MIRIS cannot meet the service requirements; or (ii) if the MIRIS can provide services in the specific working scenario: selecting, e.g., by the mobile service subsystem, work modules according to the specific service requirements; generating a layout scheme and MRIU control instructions; confirming, e.g., by the safety control subsystem, the layout scheme and MRIU control instructions; and sending, e.g., by the information transmission subsystem, the layout scheme and MRIU control instructions to IRIS and/or MRIU.

In some embodiments, methods comprise backing up, by a data management subsystem, the service request.

In some embodiments, methods comprise providing a Mobile Intelligent Roadside Infrastructure System (MIRIS) comprising a Mobile Roadside Intelligent Unit (MRIU); receiving, by an information transmission subsystem, a service request sent by an IRIS or a MRIU; and analyzing, by a mobile service subsystem, the specific working scenario of the service request. In some embodiments, methods further comprise determining, e.g., by the mobile service subsystem, that the MIRIS cannot provide services in the specific working scenario; generating, e.g., by the mobile service subsystem, a command that the MIRIS cannot meet the service requirements; transmitting the command to the information transmission subsystem; and sending, e.g., by the information transmission subsystem, the command to IRIS and/or MRIU indicating that MIRIS cannot meet the service requirements.

In some embodiments, methods further comprise determining, e.g., by the mobile service subsystem, that the MIRIS can provide services in the specific working scenario; selecting, e.g., by the mobile service subsystem, work modules according to the specific service requirements; generating a layout scheme and MRIU control instructions; confirming, e.g., by the safety control subsystem, the layout scheme and MRIU control instructions; and sending, e.g., by the information transmission subsystem, the layout scheme and MRIU control instructions to IRIS and/or MRIU.

In some embodiments, methods comprise providing a Mobile Intelligent Roadside Infrastructure System (MIRIS) comprising a Mobile Roadside Intelligent Unit (MRIU); receiving, by an intelligent communication module, a deployment command from the RUMC; planning, by an intelligent computing module, a moving path and/or a moving speed for MRIU; selecting, e.g., by the intelligent decision control module, a moving path and/or moving speed and sending the moving path and/or moving speed information to the intelligent mobile module; moving, e.g., by the intelligent mobile module, the MRIU according to the moving path and/or moving speed; and monitoring, e.g., by the intelligent mobile module, the movement status of the MRIU. In some embodiments, planning a moving path and/or a moving speed for MRIU comprises using and/or combining prediction information and/or attribute information of the MRIU. In some embodiments, methods further comprise detecting, e.g., by the intelligent sensing module, obstacles in the moving path and/or abnormal conditions; and adjusting, e.g., by the intelligent computing module adjusts, the MRIU moving path based on real-time environment information and/or the operating parameters of the MRIU to provide a new path. In some embodiments, methods comprise determining, e.g., by the intelligent decision control module, if the MRIU can reach the target position on time according to the new path. In some embodiments, methods comprise determining, e.g., by the decision control module, that the MRIU cannot reach the task location on time according to the new path; and uploading task failure information to the RUMC. In some embodiments, methods further comprise waiting, e.g., by the MRIU, for further instructions from the RUMC. In some embodiments, methods comprise determining, e.g., by the decision control module, that the MRIU can reach the task location on time according to the new path; and moving, e.g., by the intelligent mobile module, the MRIU through the new path. In some embodiments, methods comprise confirming, e.g., by the intelligent decision control module, the moving path and/or moving speed. In some embodiments, monitoring the movement status of the MRIU is monitoring the movement status of the MRIU in real-time.

In some embodiments, systems comprise a computer and/or data storage provided virtually (e.g., as a cloud computing resource). In particular embodiments, the technology comprises use of cloud computing to provide a virtual computer system that comprises the components and/or performs the functions of a computer as described herein. Thus, in some embodiments, cloud computing provides infrastructure, applications, and software as described herein through a network and/or over the internet. In some embodiments, computing resources (e.g., data analysis, calculation, data storage, application programs, file storage, etc.) are remotely provided over a network (e.g., the internet; CAVH, IRIS, or CAH communications; and/or a cellular network). See, e.g., U.S. Pat. App. Pub. No. 20200005633, incorporated herein by reference.

Embodiments of the technology may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Figure 1:
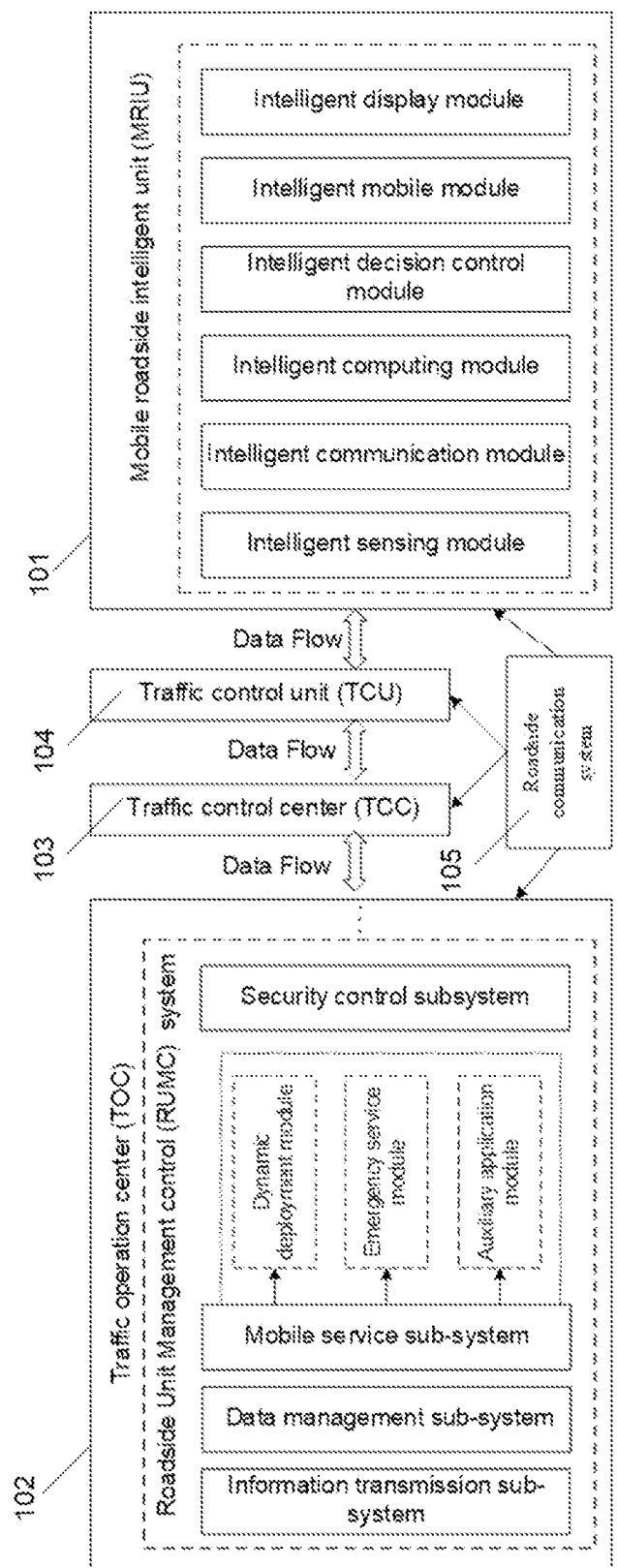
FIG. 1 is a schematic drawing showing the components and architecture of the MIRIS. 101: Mobile Roadside Intelligent Unit (MRIU); 102: Traffic Operation Center (TOC); 103: Traffic Control Center (TCC); 104: Traffic Control Unit (TCU); 105: Roadside communication system.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to automated driving and particularly, but not exclusively, to a mobile intelligent road infrastructure technology configured to serve automated driving systems by providing, supplementing, and/or enhancing autonomous driving functions for connected automated vehicles under common and unusual driving scenarios.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the word "presence" or "absence" (or, alternatively, "present" or "absent") is used in a relative sense to describe the amount or level of a particular entity (e.g., component, action, element). For example, when an entity is said to be "present", it means the level or amount of this entity is above a pre-determined threshold; conversely, when an entity is said to be "absent", it means the level or amount of this entity is below a pre-determined threshold. The pre-determined threshold may be the threshold for detectability associated with the particular test used to detect the entity or any other threshold. When an entity is "detected" it is "present"; when an entity is "not detected" it is "absent".

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, the term "number" shall mean one or an integer greater than one (e.g., a plurality).

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods. For example, a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform a function of the system or subsystem. Thus, the methods and apparatus of the embodiments, or certain aspects or portions thereof, may take the form of program code (e.g., instructions) embodied in tangible media, such as floppy diskettes, CD-ROMs, hard drives, flash memory, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (e.g., volatile and non-volatile memory and/or storage elements), at least one input device, and at least one output device. One or more programs may implement or utilize the processes described in connection with the embodiments, e.g., through the use of an application programming interface (API), reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and combined with hardware implementations.

As used herein, the term "long-tail" scenario, event, environment, etc. refers to a scenario, event, environment, etc. that occurs at a low frequency and/or a scenario, event, environment, etc. that is predicted to occur with a low probability. Exemplary long-tail scenarios, events, and/or environments include, but are not limited to, vehicle accidents; special events (e.g., sports events, hazard evacuation, etc.); construction and/or work zones; extreme and/or adverse weather (e.g., snowstorm, icy road, heavy rain, etc.); hazardous roads (e g animals on roads, rough roads, gravel, bumpy edges, uneven expansion joints, slick surfaces, standing water, debris, uphill grade, downhill grade, sharp turns, no guardrails, narrow road, narrow bridge, etc.); unclear road markings, unclear signing, and/or unclear geometric designs; high density of pedestrians and/or bicycles.

As used herein, the term "automated driving system" (abbreviated "ADS") refers to a system that performs driving tasks (e.g. lateral and longitudinal control of the vehicle) for a vehicle and thus allows a vehicle to drive with reduced human control of driving tasks and/or without human control of driving tasks. The technology described herein may be provided to support and/or interact with various types of exemplary ADS, including a road-based ADS, a CAV-based ADS, a cloud-based ADS, and/or a high-precision map ADS. As used herein, the term "road-based ADS" refers to an ADS in which the automated driving sensing functions, prediction functions, decision-making functions, and control functions are mainly provided and/or supported by the intelligent roadside infrastructure (e.g., a CAVH system). As used herein, the term "CAV-based ADS" refers to an ADS in which automated driving sensing functions, prediction functions, decision-making functions, and control functions the are mainly provided and/or supported by the on-board equipment of a CAV. As used herein, the term "cloud-based ADS" refers to an ADS in which the automated driving sensing functions, prediction functions, decision-making functions, and control functions are mainly provided and/or supported by a cloud platform (e.g., a cloud platform provided by a vendor such as, e.g., Microsoft Azure, Amazon Web Service, or Google Cloud). As used herein, the term "high precision map-based ADS" refers to an ADS in which the automated driving sensing functions, prediction functions, decision-making functions, and control functions are provided and/or supported by a high precision map system and high precision map applications (e.g., the high precision map system provides integrated automated driving functions), e.g., as provided by a vendor such as, e.g., Here, TomTom, or OpenStreet Map.

As used herein, the term "Connected Automated Vehicle Highway System" ("CAVH System") refers to a comprehensive system (e.g., an ADS) providing full vehicle operations and control for connected and automated vehicles (CAV), and, more particularly, to a system controlling CAVs by sending individual vehicles with detailed and time-sensitive control instructions for vehicle following, lane changing, route guidance, and related information. A CAVH system comprises sensing, communication, and control components connected through segments and nodes that manage an entire transportation system. CAVH systems comprise four control levels: vehicle; roadside unit (RSU), which, in some embodiments, is similar to or the same as a roadside intelligent unit (RIU); traffic control unit (TCU); and traffic control center (TCC). See U.S. Pat. Nos. 10,380,886; 10,867,512; and/or 10,692,365, each of which is incorporated herein by reference.

As used herein, the term "Intelligent Road Infrastructure System" ("IRIS") refers to a system that facilitates vehicle operations and control for CAVH systems. See U.S. Pat. Nos. 10,867,512 and/or 10,692,365, each of which is incorporated herein by reference. In some embodiments, an IRIS provides transportation management and operations and individual vehicle control for connected and automated vehicles (CAV). For example, in some embodiments, an IRIS provides a system for controlling CAVs by sending individual vehicles with customized, detailed, and time-sensitive control instructions and traffic information for automated vehicle driving, such as vehicle following, lane changing, route guidance, and other related information.

As used herein, the term "GPS" refers to a global navigation satellite system (GNSS) that provides geolocation and time information to a receiver. Examples of a GNSS include, but are not limited to, the Global Positioning System developed by the United States, Differential Global Positioning System (DGPS), BeiDou Navigation Satellite System (BDS) System, GLONASS Global Navigation Satellite System), European Union Galileo positioning system, the NavIC system of India, and the Quasi-Zenith Satellite System (QZSS) of Japan.

As used herein, the term "vehicle" refers to any type of powered transportation device, which includes, and is not limited to, an automobile, truck, bus, motorcycle, or boat. The vehicle may normally be controlled by an operator or may be unmanned and remotely or autonomously operated in another fashion, such as using controls other than the steering wheel, gear shift, brake pedal, and accelerator pedal.

As used herein, the term "automated vehicle" (abbreviated as "AV") refers to an automated vehicle in an automated mode, e.g., at any level of automation (e.g., as defined by SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806), each of which is incorporated herein by reference)).

As used herein, the term "scene" refers to an environment in which a vehicle operates or in which an object sensed by the ADS (e.g., CAVH system) operates and/or is present. In some embodiments, a "scene" is a view of an object or of a volume of space from a particular point and looking in a particular direction in three-dimensional space. In some embodiments, a "scene" comprises static and/or dynamic objects sensed by the ADS, MIRIS, IRIS, and/or CAVH system. In some embodiments, static and/or dynamic objects in a scene are identified by coordinates within the scene. In some embodiments, the technology provides (e.g., constructs) a scene that is a virtual model or reproduction of the scene sensed by the ADS, MIRIS, IRIS, and/or CAVH system. Accordingly, in some embodiments, a "scene" (e.g., the environment sensed by a vehicle and/or the composite of information sensed by an ADS, MIRIS, IRIS, or CAVH system describing the environment of the vehicle) changes as a function of time (e.g., as a function of the movement of vehicles and/or objects in the scene). In some embodiments, a "scene" for a particular vehicle changes as a function of the motion of the vehicle through a three-dimensional space (e.g., change in location of a vehicle in three-dimensional space).

As used herein, the term "allocate", "allocating", and similar terms referring to resource distribution also include distributing, arranging, providing, managing, assigning, controlling, and/or coordinating resources.

As used herein, the term "resource" refers to computational capacity (e.g., computational power, computational cycles, etc.); memory and/or data storage capacity; sensing capacity; communications capacity (e.g., bandwidth, signal strength, signal fidelity, etc.); and/or electrical power.

As used herein, the term "service" refers to a process, a function that performs a process, and/or to a component or module that is configured to provide a function that performs a process.

As used herein, the term "connected vehicle" or "CV" refers to a connected vehicle, e.g., configured for any level of communication (e.g., V2V, V2I, and/or I2V).

As used herein, the term "connected and autonomous vehicle" or "CAV" refers to an autonomous vehicle that is able to communicate with other vehicles (e.g., by V2V communication), with roadside intelligent units (RIU), traffic control signals, and/or other infrastructure (e.g., an ADS or component thereof) or devices. That is, the term "connected autonomous vehicle" or "CAV" refers to a connected autonomous vehicle having any level of automation (e.g., as defined by SAE International Standard J3016 (2014)) and communication (e.g., V2V, V2I, and/or I2V).

As used herein, the term "data fusion" refers to integrating a plurality of data sources to provide information (e.g., fused data) that is more consistent, accurate, and useful than any individual data source of the plurality of data sources.

As used herein, the term "configured" refers to a component, module, system, subsystem, etc. (e.g., hardware and/or software) that is constructed and/or programmed to carry out the indicated function.

As used herein, the terms "determine," "calculate," "compute," and variations thereof, are used interchangeably to any type of methodology, processes, mathematical operation, or technique.

As used herein, the term "reliability" refers to a measure (e.g., a statistical measure) of the performance of a system without failure and/or error. In some embodiments, reliability is a measure of the length of time and/or number of functional cycles a system performs without a failure and/or error.

As used herein, the term "support" when used in reference to one or more components of an ADS, CAVH, CAV, and/or a vehicle providing support to and/or supporting one or more other components of the ADS, CAVH, CAV, and/or a vehicle refers to, e.g., exchange of information and/or data between components and/or levels of the ADS, CAVH, CAV, and/or a vehicles; sending and/or receiving instructions between components and/or levels of the ADS, CAVH, CAV, and/or a vehicles; and/or other interaction between components and/or levels of the ADS, CAVH, CAV, and/or a vehicles that provide functions such as information exchange, data transfer, messaging, and/or alerting.

As used herein, the term "ADS component" or "component of an ADS" refers individually and/or collectively to one or more of components of an ADS and/or a CAVH system, e.g., a VIU, RIU, TCC, TCU, TCC/TCU, TOC, CAV, a supporting subsystem, and/or a cloud component.

As used herein, the term "roadside intelligent unit" (abbreviated "RIU") may refer to one RIU, a plurality of RIU, and/or a network of RIU.

As used herein, the term "mobile roadside intelligent unit" (abbreviated "MRIU") refers to a mobile RIU. In some embodiments, the MRIU is provided on a mobile component and/or platform comprising wheels, continuous track, etc. (e.g., for deployment on land). For example, in some embodiments, the MRIU is deployed on a manual vehicle; an unmanned vehicle; on specialized infrastructure (e.g., a dedicated path, road, or rails), and/or on a mobile robot. In some embodiments, the MRIU is provided on a platform for deployment in the air (e.g., comprising wings, a propeller, a balloon, etc.). For example, in some embodiments, the MRIU is provided on a platform comprising an unmanned aerial vehicle or drone. In some embodiments, the MRIU is provided for deployment in the water (e.g., comprising a buoyant component, a propeller, etc.) Exemplary deployment locations for an MRIU include, but are not limited to, positions where an RIU may be deployed. In some embodiments, exemplary locations for an MRIU include, but are not limited to, at a roadside; on, in, and/or above a highway; at an on ramp; at an off ramp; at an intersection; on a roadside building; at a bridge; at a tunnel; at a roundabout; at a bus stop; at a parking spot; at a railway crossing; at a grade crossing; in a school area; and/or at a testing ground.

As used herein, the term "critical point" refers to a portion or region of a road that is identified as appropriate to be provided embodiments of the function allocation technology provided herein. In some embodiments, a critical point is categorized as a "static critical point" and in some embodiments, a critical point is categorized as a "dynamic critical point". As used herein, a "static critical point" is a point (e.g., region or location) of a road that is a critical point based on identification of road and/or traffic conditions that are generally constant or that change very slowly (e.g., on a time scale longer than a day, a week, or a month) or only by planned reconstruction of infrastructure. As used herein, a "dynamic critical point" is a point (e.g., region or location) of a road that is a critical point based on identification of road conditions that change (e.g., predictably or not predictably) with time (e.g., on a time scale of an hour, a day, a week, or a month). Critical points based on historical crash data, traffic signs, traffic signals, traffic capacity, and road geometry are exemplary static critical points. Critical points based on traffic oscillations, real-time traffic management, or real-time traffic incidents are exemplary dynamic critical points.

In some embodiments, critical points are identified using, e.g., historical crash data (e.g., the top 20% (e.g., top 15-25% (e.g., top 15, 16, 17, 18, 19, 20, 21, 22, 23, 24, or 25%)) most frequent crash points in a road system are identified as critical points); traffic signs (e.g., where certain traffic signs (e.g., accident-prone areas) are detected are identified as critical points); traffic capacity (e.g., the top 20% (e.g., top 15-25% (e.g., top 15, 16, 17, 18, 19, 20, 21, 22, 23, 24, or 25%)) highest traffic capacity areas are identified as critical points); road geometry (e.g., roads with critical road geometry (e.g., curves, blind spots, hills, intersections (e.g., signalized intersections, stop sign intersections, yield sign intersections), roundabouts) are identified as critical points); traffic oscillation (e.g., points with significant traffic oscillations are identified as critical points); real-time traffic management (e.g., points with potential traffic management are identified as critical points); and/or real-time traffic incident (e.g., points with traffic incidents (e.g., accident, crash, congestion, construction or maintenance, weather-related event, etc.) or vehicle malfunction are identified as critical points).

As used herein, the terms "microscopic", "mesoscopic", and "macroscopic" refer to relative scales in time and space. In some embodiments, the scales include, but are not limited to, a microscopic level relating to individual vehicles (e.g., longitudinal movements (car following, acceleration and deceleration, stopping and standing) and lateral movements (lane keeping, lane changing)), a mesoscopic level relating to road corridors and/or segments (e.g., special event early notification, incident prediction, merging and diverging, platoon splitting and integrating, variable speed limit prediction and reaction, segment travel time prediction, and/or segment traffic flow prediction), and a macroscopic level relating to an entire road network (e.g., prediction of potential congestion, prediction of potential incidents, prediction of network traffic demand, prediction of network status, prediction of network travel time). In some embodiments, a time scale at a microscopic level is from 1 to 10 milliseconds and is relevant to tasks such as vehicle control instruction computation. In some embodiments, a time scale at a mesoscopic level is typically from 10 to 1000 milliseconds and is relevant to tasks such as incident detection and pavement condition notification. In some embodiments, a time scale at a macroscopic level is longer than 1 second and is relevant to tasks such as route computing.

As used herein, the automation and/or intelligence levels of vehicles (V), infrastructure (I), and system (S) are described with respect to an "intelligence level" and/or an "automation level". In some embodiments, the vehicle intelligence and/or automation level is one of the following: V0: No automation functions; V1: Basic functions to assist a human driver to control a vehicle; V2: Functions to assist a human driver to control a vehicle for simple tasks and to provide basic sensing functions; V3: Functions to sense the environment in detail and in real-time and to complete relatively complicated driving tasks; V4: Functions to allow vehicles to drive independently under limited conditions and sometimes with human driver backup; and V5: Functions to allow vehicles to drive independently without human driver backup under all conditions. As used herein, a vehicle having an intelligence level of 1.5 (V1.5) refers to a vehicle having capabilities between vehicle intelligence 1 and vehicle intelligence level 2, e.g., a vehicle at V1.5 has minimal or no automated driving capability but comprises capabilities and/or functions (e.g., hardware and/or software) that provide control of the V1.5 vehicle by a CAVH system (e.g., the vehicle has "enhanced driver assistance" or "driver assistance plus" capability).

In some embodiments, the infrastructure intelligence and/or automation level is one of the following: I0: No functions; I1: Information collection and traffic management wherein the infrastructure provides primitive sensing functions in terms of aggregated traffic data collection and basic planning and decision making to support simple traffic management at low spatial and temporal resolution; I2: I2X and vehicle guidance for driving assistance, wherein, in addition to functions provided in I1, the infrastructure realizes limited sensing functions for pavement condition detection and vehicle kinematics detection, such as lateral and/or longitudinal position, speed, and/or acceleration, for a portion of traffic, in seconds or minutes; the infrastructure also provides traffic information and vehicle control suggestions and instructions for the vehicle through I2X communication; I3: Dedicated lane automation, wherein the infrastructure provides individual vehicles with information describing the dynamics of surrounding vehicles and other objects on a millisecond time scale and supports full automated driving on CAVH-compatible vehicle dedicated lanes; the infrastructure has limited transportation behavior prediction capability; I4: Scenario-specific automaton wherein the infrastructure provides detailed driving instructions for vehicles to realize full automated driving in certain scenarios and/or areas, such as locations comprising predefined geofenced areas, where the traffic is mixed (e.g., comprises automated and non-automated vehicles); essential vehicle-based automation capability, such as emergency braking, is provided as a backup system in case the infrastructure fails; and I5: Full infrastructure automation wherein the infrastructure provides full control and management of individual vehicles under all scenarios and optimizes a whole road network where the infrastructure is deployed; vehicle automation functionality is not necessary provided as a backup; full active safety functions are available.

In some embodiments, the system intelligence and/or automation level is one of the following: S0: no function;

S1: the system provides simple functions for individual vehicles such as cruise control and passive safety function; the system detects the vehicle speed, location, and distance; S2: the system comprises individual intelligence and detects vehicle functioning status, vehicle acceleration, and/or traffic signs and signals; individual vehicles make decisions based on their own information and have partially automated driving to provide complicated functions such as assisting vehicle adaptive cruise control, lane keeping, lane changing, and automatic parking; S3: the system integrates information from a group of vehicles and behaves with ad-hoc intelligence and prediction capability, the system has intelligence for decision making for the group of vehicles and can complete complicated conditional automated driving tasks such as cooperative cruise control, vehicle platooning, vehicle navigation through intersections, merging, and diverging; S4: the system integrates driving behavior optimally within a partial network; the system detects and communicates detailed information within the partial network and makes decisions based on both vehicle and transportation information within the network and handles complicated, high level automated driving tasks, such as navigating traffic signal corridors, and provides optimal trajectories for vehicles within a small transportation network; S5: vehicle automation and system traffic automation, wherein the system optimally manages an entire transportation network; the system detects and communicates detailed information within the transportation network and makes decisions based on all available information within the network; the system handles full automated driving tasks, including individual vehicle tasks and transportation tasks, and coordinates all vehicles to manage traffic.

In some embodiments, the system dimension is dependent on the vehicle and infrastructure dimensions, e.g., as represented by the following equation (S=system automation; V=vehicle intelligence; and I=infrastructure intelligence):

$$S=f(V,I)$$

In some embodiments, vehicle intelligence is provided by and/or related to the CAV Subsystem and the infrastructure intelligence is provided by and/or related to the CAH Subsystem. One of ordinary skill in the art may refer to SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806)), which provides additional understanding of terms used in the art and herein.

DESCRIPTION

The present technology provides a Mobile Intelligent Road Infrastructure System (MIRIS) and related methods (e.g., management methods) configured to serve automated driving systems (ADS) (e.g., connected and automated vehicle highway (CAVH) system). The MIRIS comprises one or more of the following physical subsystems: (1) Mobile Roadside Intelligent Unit (MRIU); (2) Traffic Operation Center (TOC); (3) Traffic Control Center (TCC) and Traffic Control Unit (TCU); and/or (4) roadside communication system. In some embodiments, the MIRIS is supported by one or more of the following systems of the ADS or CAVH: a multi-level cloud platform (e.g., comprising microscopic cloud, mesoscopic cloud, and/or macroscopic cloud), a high-precision mapping system, an energy supply system, and/or information security system.

In some embodiments, the ADS is and/or comprises one or more of a road-based ADS, CAV-based ADS, cloud-based ADS, and/or high precision map-based ADS.

In some embodiments, the MIRIS is configured to serve intelligent vehicles having an intelligence levels of V1, V1.5, V2, V3, V4, and/or V5, e.g., as defined by SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806)), each of which is incorporated herein by reference. In some embodiments, MIRIS receives data from a vehicle (e.g., from a Vehicle Intelligent Unit (VIU) of a vehicle) and/or receives data collected by the MRIU. In some embodiments, the MIRIS generates vehicle control instructions and sends them to a vehicle (e.g., to a VIU of a vehicle).

In some embodiments, the MIRIS is configured to provide, supplement, enhance, exceed, improve, and/or replace the macroscopic, mesoscopic, and/or microscopic functions (e.g., sensing, prediction, decision-making, and/or control) for automated driving. In some embodiments, the MIRIS is configured to manage and control MRIU in complex scenarios (e.g., changes of traffic flow, changes of driving environment, emergencies, and other scenarios). In some embodiments, MIRIS is configured to provide and/or perform management and control methods for the MRIU, e.g., when a RIU of the IRIS malfunctions; when an RIU of the IRIS is failing; when a RIU of the IRIS is unable to provide adequate automated driving functions to support automated driving by vehicles (e.g., CAV); and/or when IRIS does not comprise RIU where needed to provide and/or support automated driving functions (e.g., IRIS comprises inadequate coverage by RIU to provide and/or support automated driving functions (e.g., for RIU-free points, road segments, roads, regions, and/or geographic areas)). In some embodiments, the MIRIS provides management and control methods for individual RIU deployment, e.g., for points, road segments, roads, regions, and/or geographic areas when there is no IRIS deployed (e.g., in IRIS-free points, road segments, roads, regions, and/or geographic areas).

In some embodiments, the TOC provides mid-term and long-term traffic state prediction, traffic management, traffic planning, and/or decision-making. In some embodiments, the TOC provides mid-term and long-term traffic state prediction, traffic management, traffic planning, and/or decision-making based on the multi-level cloud platform (e.g., based on the macroscopic cloud system of the multi-level cloud platform). In some embodiments, the TOC comprises a Roadside Unit Management Control (RUMC) system. In some embodiments, the RUMC is configured to formulate control strategies according to real-time traffic status and/or demands; and/or is further configured to adjust the positions of MRIUs to provide automated driving functions in various scenarios.

In some embodiments, the MRIU is configured to exchange data and information with RIU, TCU, TCC, TOC, and/or vehicles (e.g., a VIU).

In some embodiments, the MIRIS comprises a roadside communications system. In some embodiments, the roadside communications system comprises components configured to provide wired and/or wireless communications. In some embodiments, the roadside communication system provides wired or wireless data transmission between systems, e.g., using communication modes such as, e.g., LTE-V2X, 5G, 6G, 7G. In some embodiments, the roadside communications system is configured to support various types of I2X (Infrastructure-to-Everything) applications and/or communications.

In some embodiments, the multi-level cloud platform comprises cloud components at a range of scales, e.g., a macroscopic cloud, mesoscopic cloud, and/or microscopic cloud. In some embodiments, the cloud platform (e.g., macroscopic cloud, mesoscopic cloud, and/or microscopic cloud) are configured to provide computing and/or data storage resources (e.g., capacity) for the TOC, TCC, and TCU. In some embodiments, the macroscopic cloud, mesoscopic cloud, and/or microscopic cloud are configured to provide computing and/or data storage resources (e.g., capacity) for the TOC, TCC, and TCU, respectively.

In some embodiments, the MIRIS comprises a high-precision map system. In some embodiments, the MIRIS is supported by a high-precision map system, e.g., provided by the ADS (e.g., CAVH system). In some embodiments, the high precision map system is configured to provide positioning and/or mapping services for the RUMC and/or MRIU.

In some embodiments, the MIRIS comprises an energy supply system. In some embodiments, the MIRIS is supported by an energy supply system, e.g., provided by the ADS (e.g., CAVH system). In some embodiments, the energy supply system is configured to provide electrical power for the operation of the MIRIS and/or component systems of the MIRIS and/or ADS (e.g., CAVH system).

In some embodiments, the MIRIS comprises an information security system. In some embodiments, the MIRIS is supported by an information security system, e.g., provided by the ADS (e.g., CAVH system). In some embodiments, the information security system is configured to maximize communication security and/or information storage security of the MIRIS and/or component systems of the MIRIS and/or ADS (e.g., CAVH system).

In some embodiments, the RUMC system comprises an Information transmission subsystem, a Data management subsystem, a Mobile service subsystem, and/or a Security control subsystem. The information transmission subsystem is configured to provide exchange of information, data, and control instructions (e.g., MRIU control instructions) among the RUMC systems, multi-layer cloud platforms, MRIU, and/or IRIS (e.g., the information transmission subsystem is configured to exchange information, transmit data, and distribute control instructions (e.g., vehicle control instructions and/or MRIU control instructions) among the RUMC systems, multi-layer cloud platforms, MRIU, and IRIS). The data management subsystem is configured to store the quantity, position, state, energy consumption, and/or other parameter information of MRIU (e.g., describing the state and/or function of the MRIU) in the MIRIS. The data management subsystem is configured to record data of the roadway driving environment, real-time MRIU data, the historical movement and/or placement strategies for the MRIU, and/or the historical movement and/or placement of the MRIU. Further, in some embodiments, the data management subsystem is configured to perform data backup, e.g., to provide storage and backup while adjusting the position of MRIU in the road network and/or to store movement plans generated by the mobile service subsystem. The mobile service subsystem is configured to analyze mission requirements. For example, in some embodiments, the mobile service system formulates a MRIU deployment plan (e.g., comprising MRIU locations and/or movements) according to the corresponding roadway scene and MRIU parameters recorded in the data management subsystem (e.g., MRIU position, MRIU status, and/or MRIU energy consumption information). In some embodiments, the mobile service subsystem generates specific MRIU control strategies and/or task instructions to provide an MRIU at a specific location and/or to adjust the location of an MRIU. The security control subsystem is configured to confirm mobile commands provided by the mobile service subsystem and to send commands to the information transmission subsystem for execution, thus maximizing the accuracy and control security for the MRIU.

In some embodiments, the RUMC is configured to perform RUMC methods. For example, in some embodiments, RUMC methods comprise receiving (e.g., by the information transmission subsystem) a service request sent by IRIS or MRIU; backing up (e.g., by the data management subsystem) the request; analyzing (e.g., by the mobile service subsystem) the specific working scenario of the request; and judging (e.g., by the mobile service subsystem) if the MIRIS can provide adequate services for the scenario and automated driving task. In some embodiments, if the judging step indicates that the MIRIS can provide adequate services in the scenario for the automated driving task, methods further comprise generating (e.g., by the mobile service subsystem) a MRIU layout scheme and MRIU control instructions (e.g., providing the locations of MRIU and/or MRIU control instructions to place and/or move the MRIU); confirming (e.g., by the safety control subsystem) the MRIU layout scheme and MRIU control instructions; and sending the MRIU layout scheme and MRIU control instructions (e.g., providing the locations of MRIU and/or MRIU control instructions to place and/or move the MRIU) to the information transmission subsystem. In some embodiments, if the judging step indicates that the MIRIS cannot provide adequate services in the scenario for the automated driving task, methods further comprise generating (e.g., by the mobile service subsystem) a command indicating that the MIRIS cannot meet the service requirements; transmitting the command to the information transmission subsystem; and transmitting (e.g., by the information transmission subsystem) the received command to the IRIS or MRIU.

In some embodiments, the mobile service subsystem comprises a dynamic deployment module, an emergency service module, and/or an auxiliary application module. The dynamic deployment module is configured to balance service provided by the MIRIS and/or ADS (e.g., CAVH system) and demands of vehicles (e.g., CAV) and/or traffic for service provided by the MIRIS and/or ADS (e.g., CAVH system). Accordingly, in some embodiments, the dynamic deployment module is configured to analyze MIRIS and/or ADS (e.g., CAVH system) service capabilities and demands of vehicles (e.g., CAV) for MIRIS and/or ADS (e.g., CAVH system) services. In some embodiments, the dynamic deployment module is configured to analyze historical MIRIS and/or ADS (e.g., CAVH system) service capabilities and demands of vehicles (e.g., CAV) for MIRIS and/or ADS (e.g., CAVH system) services and/or to predict MIRIS and/or ADS (e.g., CAVH system) service capabilities and demands of vehicles (e.g., CAV) for MIRIS and/or ADS (e.g., CAVH system) services. In some embodiments, the dynamic deployment module is configured to optimize services provided by the MIRIS and/or ADS (e.g., CAVH system) based on the demands of vehicles (e.g., CAV) and/or traffic for service provided by the MIRIS and/or ADS (e.g., CAVH system). In some embodiments, the dynamic deployment module is configured to receive data describing real-time and/or predicted changes in CAV traffic flow, e.g., for different time periods and/or for different geographic areas.

In some embodiments, the dynamic deployment module is configured to sense (e.g., perceive), recognize, and/or analyze a scenario and/or a combination of scenarios and generate MRIU deployment plans, e.g., to adjust the quantity and/or position of MRIUs in the road network. Accordingly, the dynamic deployment module is configured to provide and manage a dynamic balance between service capabilities (e.g., service provided by the MIRIS and/or ADS (e.g., CAVH system)) and traffic demand (e.g., demands of vehicles (e.g., CAV) and/or traffic for service provided by the MIRIS and/or ADS (e.g., CAVH system)).

In some embodiments, the dynamic deployment module is module is configured to provide and manage a dynamic balance between service capabilities and traffic demands in environments and/or scenarios comprising one or more of (e.g., combinations of) different types of roads and road sections (e.g., freeways, expressways, entrances, exits, main sections, service areas, urban roads, urban expressways, arterial roads, secondary roads, access roads, and intersections); different types of intersections (e.g., normal intersection, three-dimensional intersections); different numbers of lanes (e.g., two-way four-lane, two-way six-lane, two-way eight-lane); different types of lanes (e.g., mixed traffic lanes, bus lanes, large passenger car lanes, large truck lanes, commuter lanes); different time periods (e.g., regular times, morning peak traffic, evening peak traffic, holidays, special events); different traffic states (e.g., free flow, synchronous flow, wide moving jam); and/or combinations of any of the foregoing.

In some embodiments, the emergency service module is configured to manage a "long tail" scenario for autonomous driving. Specifically, the emergency service module is configured to detect and recognize emergency or "long tail" scenarios, e.g., severe weather, traffic incident, construction, special event, and/or social security incident. In some embodiments, the emergency service module generates a MRIU management and control strategy in response to emergency scenarios and supplements or enhances the sensing, prediction, decision-making, and/or vehicle control function of the ADS (e.g., CAVH system) in special scenarios (e.g., long-tail scenarios).

In some embodiments, the emergency service module is configured to control vehicles and/or manage traffic for a scenario comprising one or more of (e.g., combinations of) severe weather (e.g., ice, snow, dense fog, heavy rain, hail, typhoon, tornado, sandstorm); complex road environment (e.g., long tunnels, steep grade (e.g., ascent or descent), multiple bends (e.g., curvy road, hairpin turns), unmarked roads, visual blind spots (e.g., at intersections), areas comprising high quantities and/or concentrations of pedestrians and/or bicycle traffic; animal crossing; environmental incidents (e.g., road collapse, landslide, flood (road washout), rockslide, tree across road, mudslide, earthquake, power failure, signal interference, cyber-attack); construction (e.g., construction of new roads, road repairs, maintenance, bridge repairs, tunnel repairs); traffic incidents (e.g., vehicle collision, scratch, rollover, fire, and other traffic accidents); special events (e.g., concerts, theatre performances, operas, sports events, exhibitions, community events, and other events that require traffic control and management); social security events (e.g., toxic gas leakage, chemical spill, emergency evacuation, rescue of wounded, criminal arrests, roadblock, checkpoint, and other social security events that cause traffic condition changes); and/or combinations of any of the foregoing. In some embodiments, the emergency service module is configured to control vehicles and/or manage traffic for a scenario comprising an incident that causes an RIU and/or a MRIU to fail and/or to provide inadequate support for automated driving tasks for the scenario. In some embodiments, the emergency service module is configured to control vehicles and/or manage traffic for a scenario comprising a construction activity that causes the suspension of fixed RIU services. In some embodiments, the emergency service module is configured to control vehicles and/or manage traffic for a scenario comprising a traffic accident that causes damage to the IRIS (e.g., IRIS infrastructure).

In some embodiments, the auxiliary application module is configured to generate MRIU control strategies and/or schemes for additional service requirements provided to the automated driving system (e.g., assisting in deploying fixed RIU in the IRIS, updating high-precision map system, and/or collecting traffic information).

In some embodiments, the MRIU comprises an Intelligent sensing module; an Intelligent communication module; an Intelligent computing module; an Intelligent decision control module; an Intelligent mobile module; and/or an Intelligent display module. In some embodiments, the intelligent sensing module is configured to provide information input for controlling vehicles and/or managing traffic by the ADS (e.g., CAVH system) and/or providing information support for moving MRIU. The intelligent sensing module is configured to perform a sensing function comprising one or more of (e.g., combinations of) an environment sensing function (e.g., for detecting and/or monitoring traffic flow, vehicle movement parameters, road condition, road alignment, weather, and obstacle information) and/or a mobile state sensing function (e.g., for sensing parameters of MRIU (e.g., MRIU longitude, MRIU latitude, MRIU moving speed, and/or MRIU acceleration). In some embodiments, the sensing function comprises use of data provided by a sensor (e.g., radar, camera, lidar, and/or weather sensors). In some embodiments, the mobile state sensing function comprises use of data provided by a GNSS and/or an inertial navigation system.

In some embodiments, the intelligent communication module provides and/or supports multi-mode communication, e.g., using LTE-V2X, Wi-Fi, GPS/BeiDou, 4G, 5G, 6G, and/or 7G. In some embodiments, the intelligent communication module provides low-delay (low-latency), high-reliability, and/or high-density data exchange among MRIU and other infrastructure components, e.g., RIU; TCU; TCC; TOC; and/or VIU.

In some embodiments, the intelligent computing module is configured to provide data fusion, data storage, and/or data feature extraction, e.g., for sensing data and/or for multi-source sensing data. In some embodiments, the intelligent computing module is configured to predict traffic flow state (e.g., on a microscopic and/or mesoscopic time scale) and to optimize a moving speed and/or path for MRIU in real-time. In some embodiments, the intelligent competent module comprises one or more of (e.g., combinations of) a data storage unit (e.g., configured to store traffic information (e.g., collected by the intelligent sensing module and processed by the multi-level cloud platform), backup task instructions (e.g., sent by the RUMC); and/or record the working parameters of the MRIU); an edge computing unit (e.g., configured to perform data fusion and/or data feature extraction for the traffic information; predict (e.g., on a microscopic and/or mesoscopic time scale) lane traffic flow parameters and/or the movement state of the connected automated vehicles; and/or supplement the computing capacity of the ADS system); and/or a route planning unit (e.g., configured to plan a moving path and/or trajectory of MRIU; and optimize the moving speed and/or trajectory of MRIU). In some embodiments, the edge computing unit is configured to identify, analyze, and/or predict a change of the external environment and/or the moving state of the MRIU.

In some embodiments, the intelligent decision control module is configured to determine and/or provide vehicle control and traffic management strategies, to generate vehicle control instructions; and/or to distribute vehicle control information to CAV (e.g., CAV at any intelligence level). In some embodiments, the intelligent decision control module is configured to determine the moving speed and/or path of MRIU. In some embodiments, the intelligent decision control module comprises one or more of (e.g., combinations of) a decision-making unit (e.g., configured to provide and/or improve the decision-making function of CAV (e.g., CAV at any intelligence level), e.g., under various scenarios; and/or to provide traffic management decisions under various special scenarios); a control unit (e.g., configured to generate vehicle control instructions for CAV (e.g., CAV at any intelligence level); and/or enhance and/or maximize the safety of CAV in various unusual scenarios); and/or a route selection unit (e.g., configured to determine a moving path; and/or to determine if the planned path is adequate to provide automated driving for the automated driving task assigned by the RUMC).

In some embodiments, the intelligent mobile module is configured to relocate the MRIU (e.g., according to the speed and path determined and/or provided by the intelligent decision control module); monitor the movement status and/or energy consumption of the MRIU (e.g., in real-time); and/or provide feedback information (e.g., describing a failure or delay) to the intelligent decision control module (e.g., in real-time).

In some embodiments, the intelligent display module is configured to assist the driving of CAV (e.g., CAV at any intelligence level (e.g., CAV at a low intelligence level (e.g., V1, V1.5, or V2) and/or CAV at a high intelligence level (e.g., V3, V4, or V5) and having a VIU failure)).

In some embodiments, the technology provides methods for moving an MRIU. In some embodiments, methods for moving an MRIU comprise receiving (e.g., by the intelligent communication module) a deployment command from the RUMC; planning (e.g., by the intelligent computing module) the MRIU moving path and/or the MRIU moving speed; selecting (e.g., by the intelligent decision control module) and optionally confirming (e.g., by the intelligent decision control module) the MRIU moving path and/or MRIU moving speed; and sending the MRIU moving path and/or MRIU moving speed to the intelligent mobile module. In some embodiments, methods comprise moving (e.g., by the intelligent mobile module) an MRIU according to the calculated MRIU path and/or MRIU moving speed; and monitoring (e.g., by the intelligent mobile module) the movement status of MRIU (e.g., in real-time). In some embodiments, methods comprise detecting (e.g., by the intelligent sensing module) the presence of obstacles in the MRIU path and/or detecting (e.g., by the intelligent mobile module) abnormal conditions; and re-planning (e.g., by the intelligent computing module) the MRIU moving path. In some embodiments, methods comprise determining (e.g., by the intelligent decision control module) if the MRIU can reach the task position on time according to the new planning path. In some embodiments, methods comprise determining (e.g., by the intelligent decision control module) that the MRIU cannot reach the task location on time according to the new planning path; uploading (e.g., by the intelligent decision control module) task failure information to the RUMC; and, optionally, waiting (e.g., by the MRIU) for further MRIU control instructions from the RUMC. In some embodiments, methods comprise determining (e.g., by the intelligent decision control module) that the MRIU can reach the task location on time according to the new planning path; and moving (e.g., by the intelligent mobile module) the MRIU according to the updated MRIU path to the desired target location for the MRIU.

In some embodiments, the technology provides a management control method for MRIU. In some embodiments, the MIRIS is configured to perform a management control method for MRIU. In some embodiments, the MIRIS performs a management control method when an RIU malfunctions, when an RIU is non-functional, and/or when an RIU cannot provide adequate automated driving functions to vehicles (e.g., CAV). In some embodiments, management control methods comprise detecting (e.g., by IRIS) a failure (e.g., a partial failure or a complete failure) of an RIU and/or detecting an RUI that is not able to provide adequate functions for automated driving; and, optionally, adjusting (e.g., reallocating resources) by the IRIS to provide adequate functions for automated driving. In some embodiments, if the IRIS cannot adjust (e.g., reallocate resources) to provide adequate functions for automated driving, methods comprise sending (e.g., by IRIS) a service request to the RUMC. In some embodiments, methods comprise determining (e.g., by RUMC) if MRIU are available for use by the ADS (e.g., CAVH system (e.g., IRIS of the CAVH system)). If MRIU are available, methods comprise planning (e.g., by the RUMC) a MRIU scheduling scheme; and sending MRIU moving instructions and/or work tasks to the selected MRIU. Finally, in some embodiments, methods comprise moving MRIU to the specified location; and performing by the MRIU automated driving tasks, e.g., in cooperation with the RIU. In some embodiments, if MRIU are not available for use by the ADS (e.g., CAVH system (e.g., IRIS of the CAVH system)), methods comprise reducing the intelligence level of the area (e.g., regions where MRIU are not available for use by the ADS (e.g., CAVH system (e.g., IRIS of the CAVH system))).

In some embodiments, the technology provides a management control method for MRIU in locations where the IRIS has no RIU deployed (e.g., RIU-free point, road segments, roads, regions, etc.). In some embodiments, the MIRIS is configured to perform a management control method for MRIU in locations where the IRIS has no RIU deployed (e.g., RIU-free points, road segments, roads, regions, etc.). In some embodiments, the MIRIS performs a management control method in locations where the IRIS has no RIU deployed (e.g., RIU-free points, road segments, roads, regions, etc.). In some embodiments, management control method in locations where the IRIS has no RIU deployed comprise detecting (e.g., by IRIS) a service demand in the area without a RIU; and sending a service request to the RUMC. In some embodiments, methods comprise determining (e.g., by RUMC) if MRIU are available for use by the ADS (e.g., CAVH system (e.g., IRIS of the CAVH system)). If MRIU are available, methods comprise planning (e.g., by RUMC) a scheduling scheme for the MRIU; and sending movement instructions to the MRIU. In some embodiments, methods further comprise moving the MRIU to the designated position; and completing automated driving tasks, e.g., automated driving tasks managed by the IRIS using the MRIU as a temporary RIU. In some embodiments, if MRIU are not available for use by the ADS (e.g., CAVH system (e.g., IRIS of the CAVH system)), methods comprise reducing the intelligence level of the area (e.g., locations where the IRIS has no RIU deployed and/or where MRIU are not available for use by the ADS (e.g., CAVH system (e.g., IRIS of the CAVH system))).

In some embodiments, the technology provides a management control method for MRIU to supplement coverage of RIU for an IRIS. In some embodiments, the MIRIS is configured to perform a management control method for MRIU to supplement coverage of RIU for an IRIS. In some embodiments, methods comprise receiving (e.g., by RUMC) a command to detect the deployment position of RIU (e.g., collecting deployment data describing the deployment locations of RIU); and determining (e.g., by RUMC) if MRIU are available for use by the ADS (e.g., CAVH system (e.g., IRIS of the CAVH system)). In some embodiments, methods comprise detecting (e.g., by RUMC) the deployment position of RIU; and determining (e.g., by RUMC) if MRIU are available for use by the ADS (e.g., CAVH system (e.g., IRIS of the CAVH system)). If MRIU are available, methods comprise planning (e.g., by RUMC) a scheduling scheme for the MRIU; and sending movement instructions to the MRIU. In some embodiments, methods further comprise moving the MRIU to the designated position; and collecting and uploading data describing the deployment of RIU and/or MRIU to the RUMC. In some embodiments, methods comprise determining (e.g., calculating) (e.g., by RUMC) an optimal location of RIU based on the detection results.

Although the disclosure herein refers to certain illustrated embodiments, it is to be understood that these embodiments are presented by way of example and not by way of limitation.

For example, e.g., as shown in FIG. 1, the MIRIS comprises components arranged in an architecture and data flows. In some embodiments, the MIRIS comprises structural components, e.g., a Mobile Roadside Intelligent Unit (MRIU) 101, a Traffic Operation Center (TOC) 102, a Traffic Control Center (TCC) 103, a Traffic Control Unit (TCU) 104, and/or a Roadside communication system 105.

Figure 2:
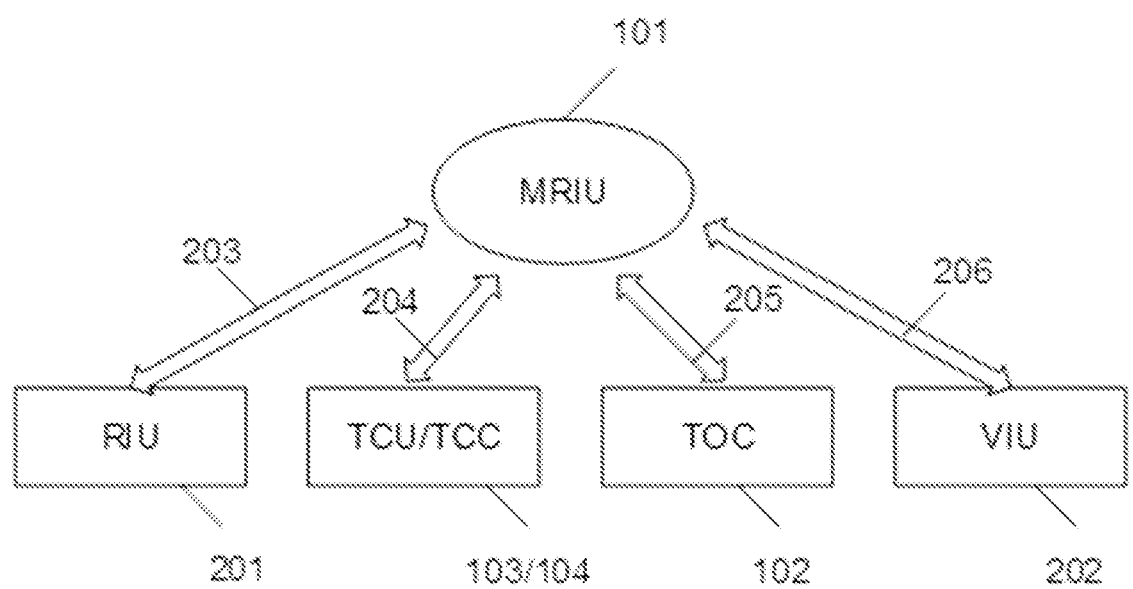
FIG. 2 is a schematic drawing showing interactions between the MIRIS and other systems. 201: Roadside Intelligent Unit (RIU); 202: Vehicle Intelligent Unit (VIU); 203: Data flow between MRIU and RIU; 204: Data flow between MRIU and TCC/TCU; 205: Data flow between MRIU and TOC; 206: Data flow between MRIU and VIU.

In some embodiments, e.g., as shown in FIG. 2, the MIRIS interacts with other systems. In particular, in some embodiments, the MRIU 101 exchanges data and information with RIU 201, TCU 103, TCC 104, TOC 102, and/or VIU 202.

Figure 3A:
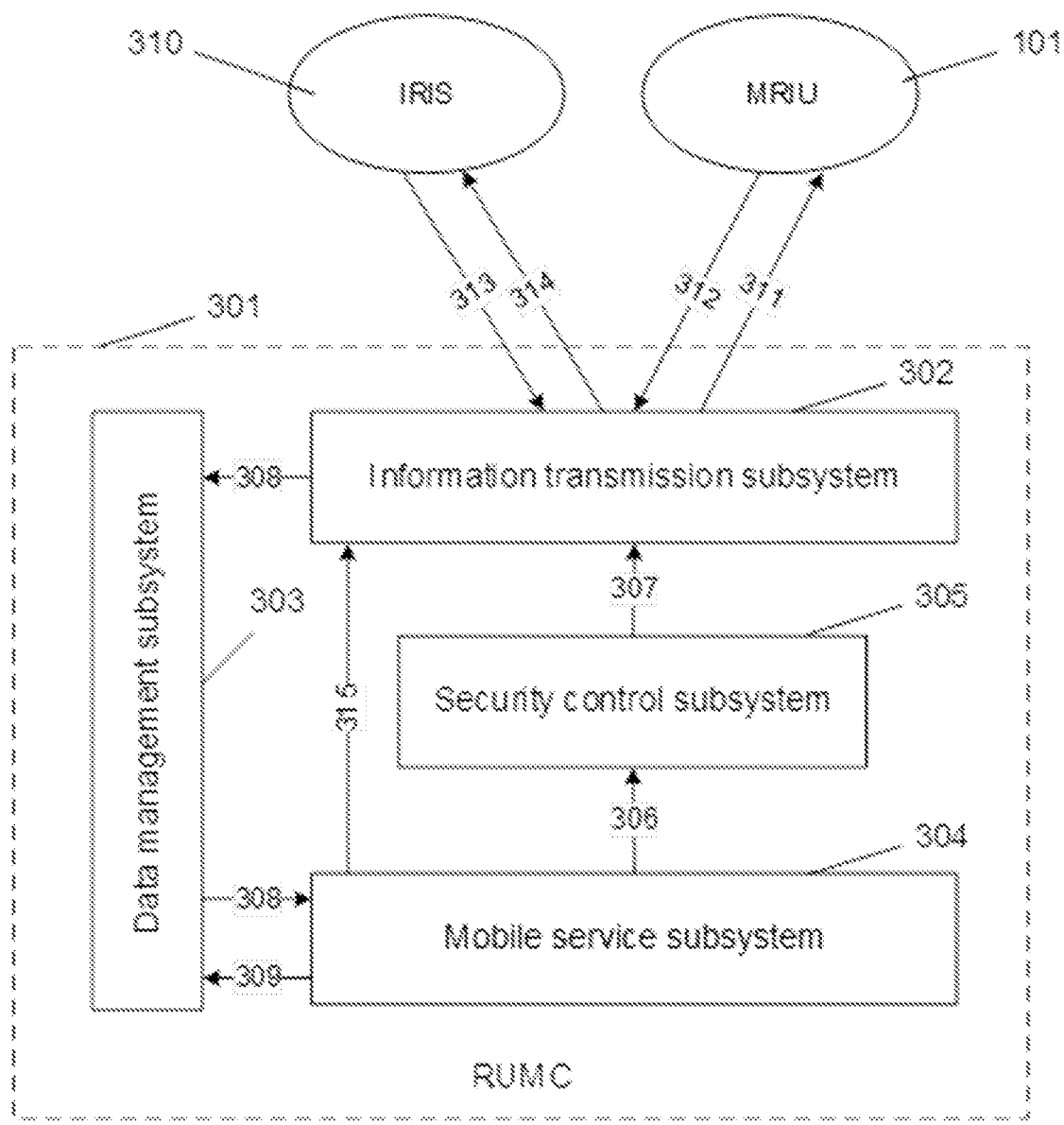
FIG. 3A is a schematic drawing showing the components and architecture of the RUMC system. 301: Roadside Unit Management Control (RUMC) system; 302: Information transmission subsystem; 303: Data management subsystem; 304: Mobile service subsystem; 305: Security control subsystem; 306: Layout plan and control instructions; 307: Confirmed layout plan and control instructions; 308: Service request; 309: Backup of layout scheme and control instruction; 310: Intelligent Road Infrastructure System (IRIS); 311: Service request reply for MRIU; 312: Service request from the MRIU; 313: Service request from the IRIS; 314: Service request reply for IRIS; 315: Command that the MIRIS cannot satisfy the service request.

In some embodiments, e.g., as shown in FIG. 3A, the technology provides a RUMC system (e.g., comprising components arranged in an architecture and data flows). In some embodiments, the RUMC system 301 comprises an information transmission subsystem 302, a data management subsystem 303, a mobile service subsystem 304, and/or a security control subsystem 305. The information transmission subsystem 302 provides information exchange, data transmission 302, and/or control instruction distribution among the RUMC system 301, MRIU 101, and/or IRIS 310. The data management subsystem 303 stores the number, location, status, energy consumption, and other parameter information of the MRIUs 101 in the MIRIS. The data management subsystem records the scene data, the real-time data of MRIU 101, and the historical movement plans of the MRIU 101. Furthermore, the data management provides data backup for location adjustment of MRIU 101 in the road network and/or movement plans generated by the mobile service subsystem 304. The mobile service subsystem 304 analyzes the mission requirements; and formulates the MRIU 101 deployment plan according to the corresponding scene and MRIU parameters recorded in the data management subsystem (e.g., location, status, and energy consumption information). The mobile service subsystem 304 provides specific MRIU control strategies and task instructions to adjust the location of MRIU. The security control subsystem 305 confirms the MRIU movement commands provided by the mobile service subsystem 304 and sends the MRIU movement commands to the information transmission subsystem 302 for execution, which maximizes the accuracy and control security for the MRIU.

Figure 3B:
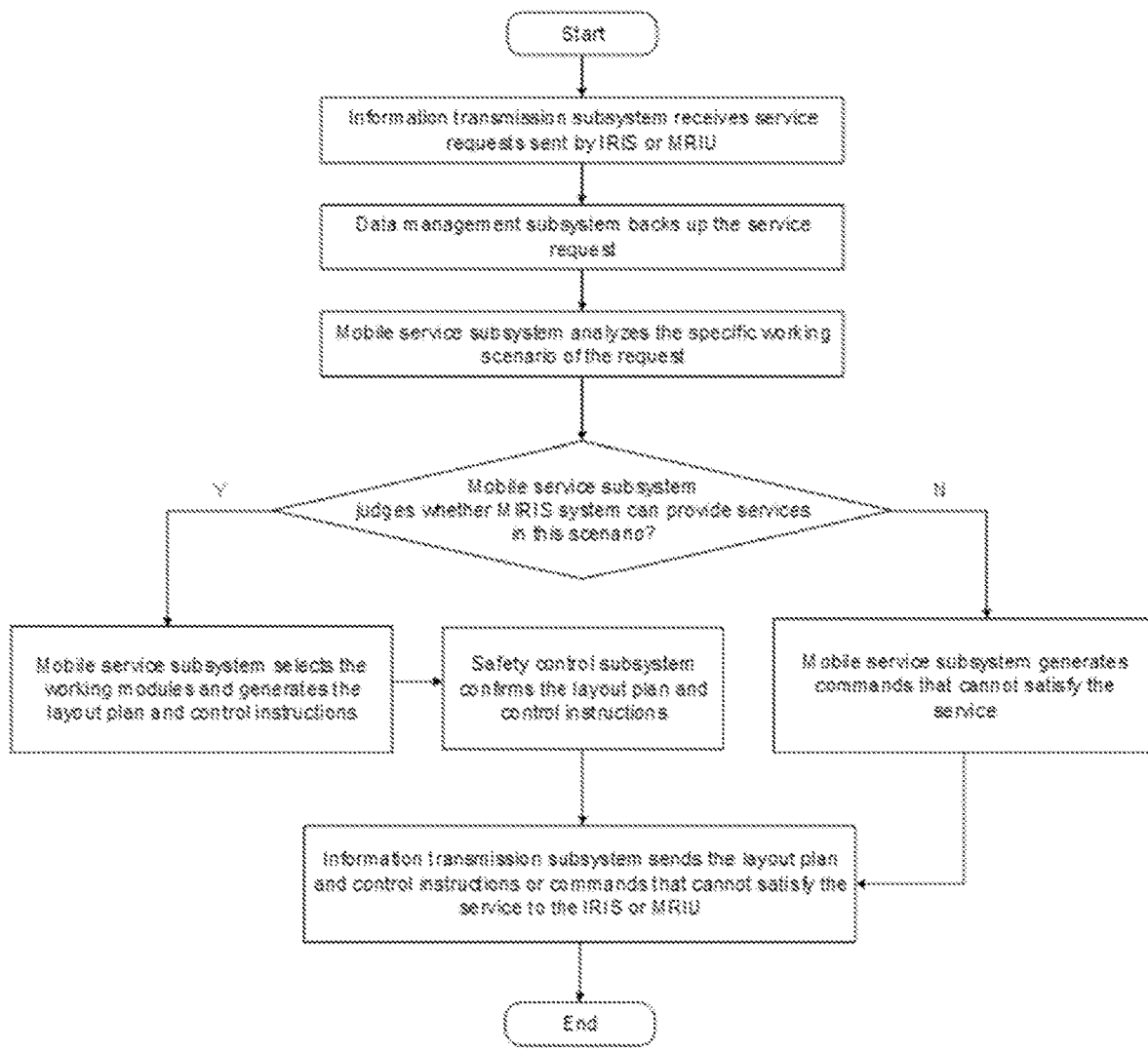
FIG. 3B is a flow chart showing an exemplary method performed by the RUMC system.

In some embodiments, e.g., as shown in FIG. 3B, the technology provides methods for the operation of the RUMC system. In some embodiments, the information transmission subsystem receives the service request sent by the IRIS or MRIU. The data management subsystem backs up the service request. The mobile service subsystem analyzes the specific work scenario of the service request. The mobile service subsystem determines if the MIRIS can provide services in this scenario. If the services cannot be provided, the mobile service subsystem generates a command indicating that the MIRIS cannot meet the service requirements and transmits the command to the information transmission subsystem. The information transmission subsystem sends the command to the IRIS or MRIU. If services can be provided, the mobile service subsystem selects the corresponding work modules according to the service requirements of the scene and generates the deployment plan and control instructions. The security control subsystem confirms the deployment plan and control instructions. The information transmission subsystem sends the deployment plan and control instructions to the IRIS or MRIU.

Figure 4:
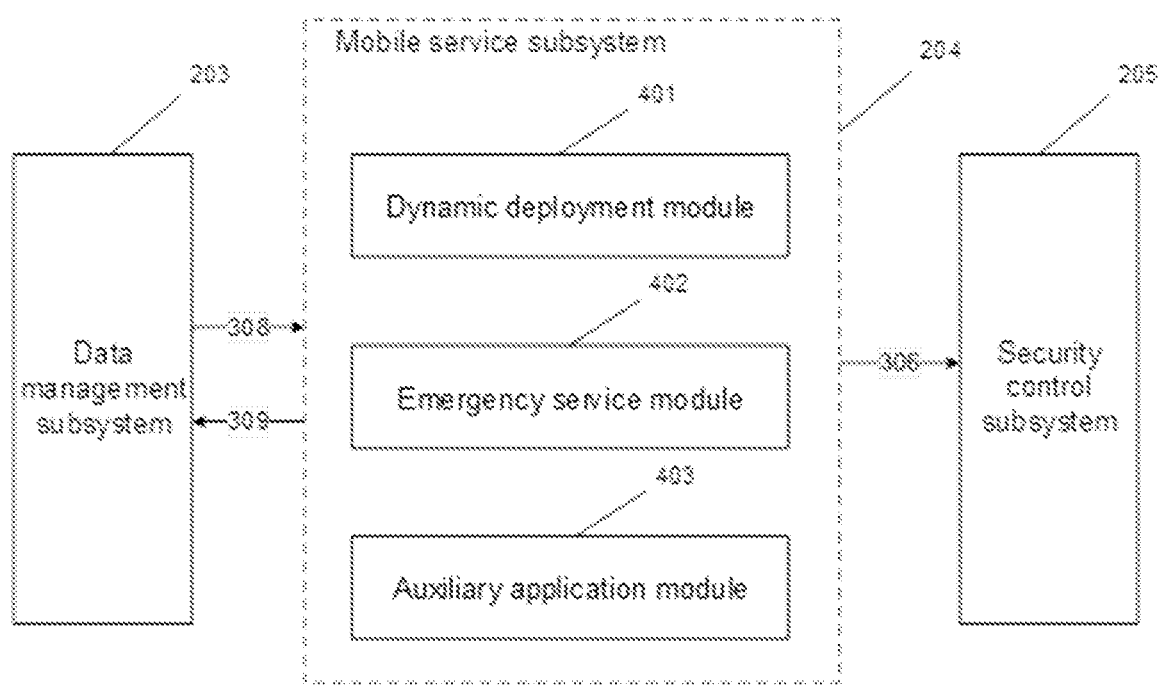
FIG. 4 is a schematic drawing showing the mobile service subsystem in the RUMC. 401: Dynamic deployment module; 402: Emergency service module; 403: Auxiliary application module.

In some embodiments, e.g., as shown in FIG. 4, the RUMC comprises a mobile service subsystem. As shown in FIG. 4, the mobile service subsystem comprises a dynamic deployment module 401, an emergency service module 402, and an auxiliary application module 403. The dynamic deployment module 401 solves the problem of imbalance between service and demand caused by CAV flow changes in different time periods and/or different areas. Through the perception and recognition of single scenario or combined scenarios, the dynamic deployment module 401 provides deployment plans to adjust the number and/or position of MRIUs in the road network, thus providing a dynamic balance between service capabilities and demands for service resulting from traffic flow. The emergency service module 402 provides solutions to "long tail" phenomenon existing in autonomous driving. The emergency service module 402 can perceive, recognize, and analyze a variety of emergency scenarios such as severe weather, incidents, construction, special events, and social security incidents. The emergency service module 402 generates the MRIU management and control strategies in response to emergency scenarios and supplements or enhances the perception, prediction, decision-making, and vehicle control functions of the autonomous driving system in special scenarios. The auxiliary application module 403 provides MRIU control strategies or schemes for other service requirements in the autonomous driving system, such as assisting the installation of fixed RIU in the IRIS, updating high-precision map system, and collecting traffic information.

Figure 5:
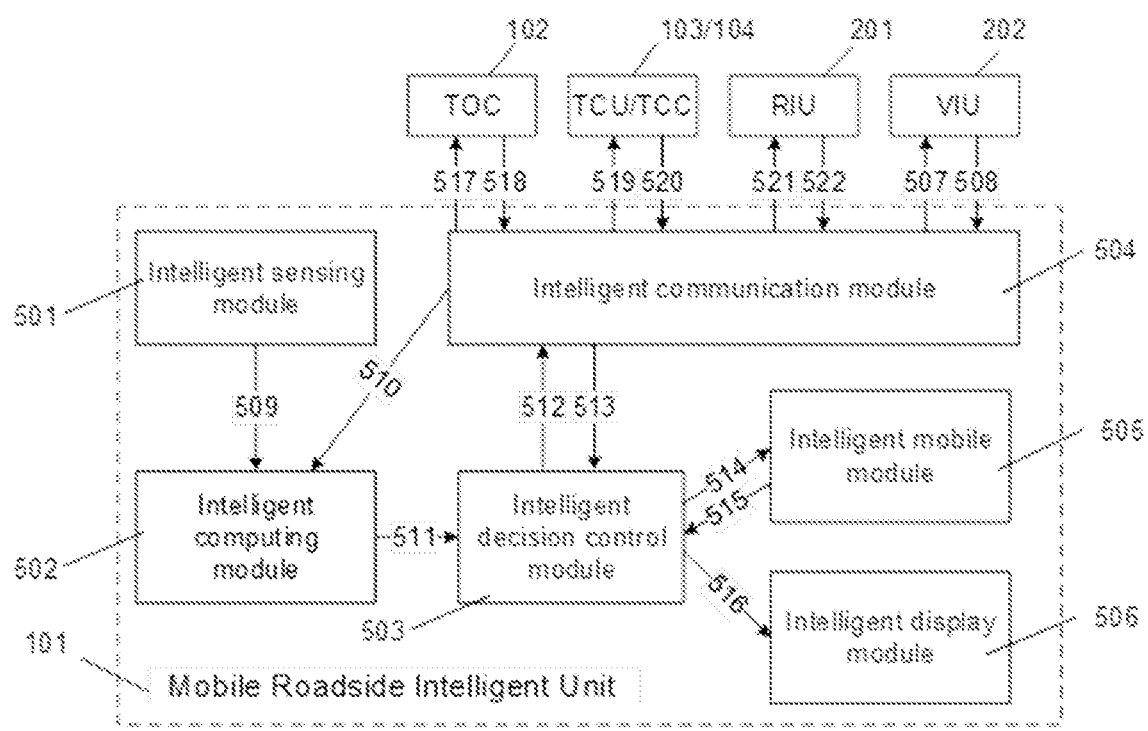
FIG. 5 is a schematic drawing of the MRIU components and architecture. 501: Intelligent sensing module; 502: Intelligent computing module; 503: Intelligent decision control module; 504: Intelligent communication module; 505: Intelligent mobile module; 506: Intelligent display module; 507: Data transferred from MRIU to VIU; 508: Data obtained by MRIU from VIU; 509: Traffic information collected by the intelligent sensing module; 510: Data flow from intelligent communication module to intelligent computing module; 511: Data flow from intelligent computing module to intelligent decision control module; 512: Data flow from intelligent decision control module to intelligent communication module; 513: Data flow from intelligent communication module to intelligent decision control module; 514: Mobile path of the intelligent mobile module; 515: Movement status of MRIU; 516: Control instructions for the intelligent display module; 517: Data obtained by MRIU from TOC; 518: Data transferred from MRIU to TOC; 519: Data obtained by MRIU from TCU/TCC; 520: Data transferred from MRIU to TCU/TCC; 521: Data obtained by MRIU from RIU; 522: Data transferred from MRIU to RIU.

In some embodiments, e.g., as shown in FIG. 5, the MRIU comprises a number of modules arranged in an architecture and data flows. In particular, the intelligent sensing module 501 detects and monitors the environment through radar, camera, lidar, and weather sensors. The GNSS and inertial navigation systems are used to sense the mobile state of MRIU. The intelligent communication module 504 provides data exchange between MRIU 101 and RIU 201, TCU 103, TCC 104, TOC 102, and/or VIU 202 with multi-mode communication of LTE-V2X, WiFi, GPS/BeiDou, 4G, 5G, 6G, and/or 7G. The intelligent computing module 502 provides data fusion and feature extraction for the traffic information collected by the intelligent sensing module 501. The intelligent computing module combines the mesoscopic and macroscopic traffic information provided by the multi-level cloud platform to predict short-term traffic flow state and optimize the moving speed and path for MRIU in real-time. The intelligent decision control module 503 uses the data processed by the intelligent computing module 502 to formulate vehicle control strategies, generate vehicle control instructions, and distribute vehicle control information for the connected automated vehicles. The intelligent decision control module 503 also determines the moving speed and path of MRIU. The intelligent mobile module 505 moves the MRIU according to the pre-determined speed and path. In case of failure or delay, the intelligent mobile module 505 feeds back the information to the intelligent decision control module 503 (e.g., in real-time). The intelligent display module 506 can assist the driving of low-intelligence-level (e.g., V1, V1.5, V2) connected automated vehicles and high-intelligent-level (e.g., V3, V4, V5) connected automated vehicles having a VIU failure according to the control instructions generated by intelligent decision control module 503.

Figure 6:
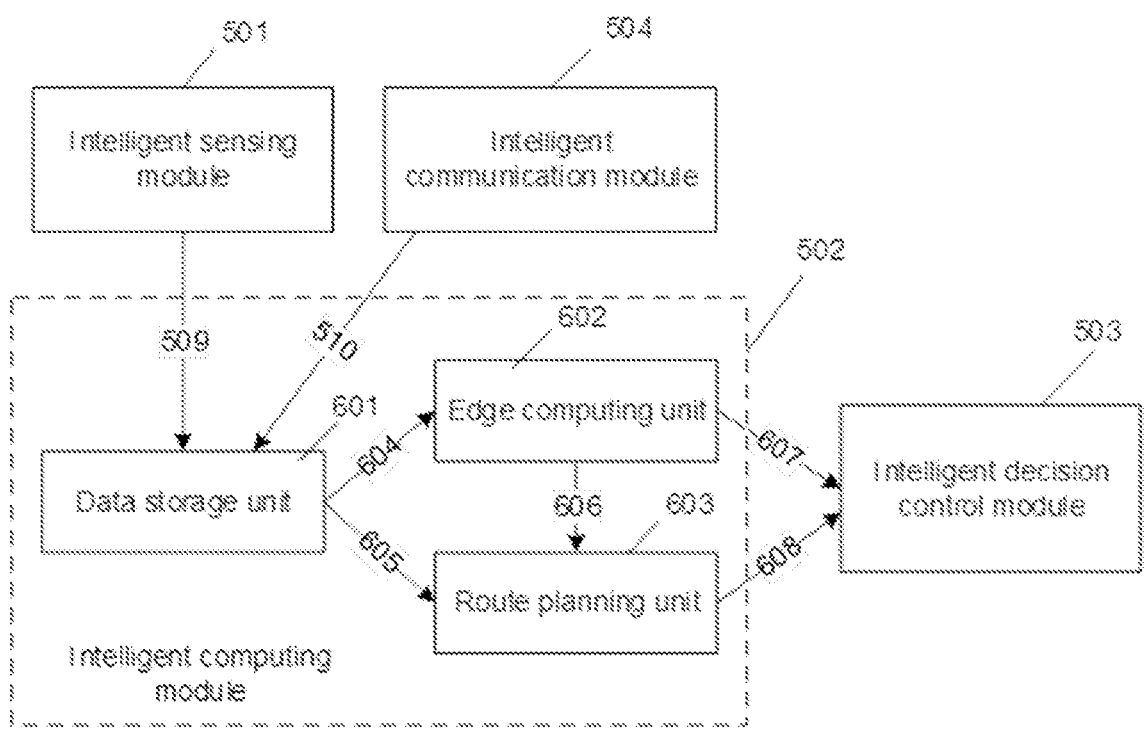
FIG. 6 is a schematic drawing of the intelligent computing module components and architecture. 601: Data storage unit; 602: Edge computing unit; 603: Route planning unit; 604: Traffic information provided to the edge computing unit; 605: Traffic information provided to the route planning unit; 606: Results of identifying, analyzing, and/or predicting a change of the external environment and/or moving state of the MRIU; 607: Short-term prediction for the lane-level traffic flow parameters and the movement states of the connected automated vehicles; 608: Mobile scheme provided by the route planning unit.

In some embodiments, e.g., as shown in FIG. 6, the intelligent computing module comprises components arranged in an architecture and data flows. The data storage unit 601 stores traffic information collected by the intelligent sensing module 501 and the traffic information processed by the multi-level cloud platform. The edge computing unit 602 performs data fusion and feature extraction for the traffic information collected by the intelligent sensing module 501. The edge computing unit combines the mesoscopic and macroscopic traffic information 510 provided by the multi-level cloud platform to make a short-term prediction 607 for the traffic flow parameters of a lane and the movement state of the connected automated vehicle. According to the information 605 provided by the data storage unit 601 and the prediction 605 provided by edge computing unit 602, the route planning unit 603 obtains the optimization result 608 of the moving speed and path for MRIU in real-time.

Figure 7:
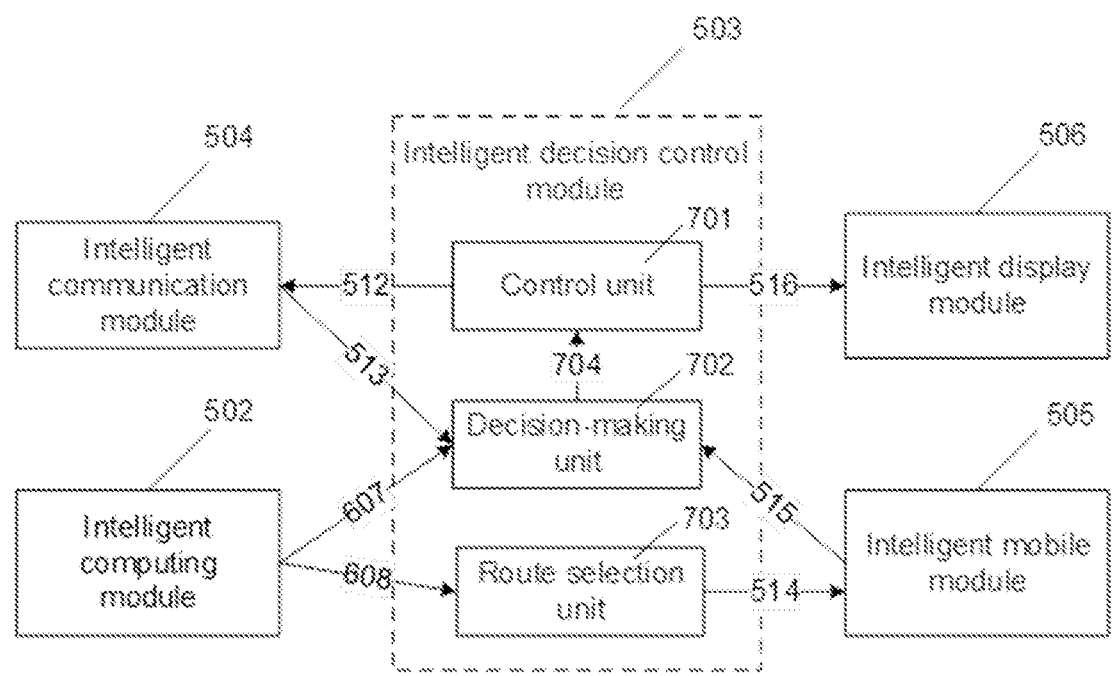
FIG. 7 is a schematic drawing showing the intelligent decision control module components and architecture. 701: Control unit; 702: Decision-making unit; 703: Route selection unit; 704: Decision information provided by the decision-making unit.

In some embodiments, e.g., as shown in FIG. 7, the intelligent decision control module comprises components arranged in an architecture and data flows. The decision-making unit 702 uses the data processed by the intelligent computing module 502 to make traffic management decisions 704. The control unit 701 makes control instructions 512 for the connected automated vehicle with different intelligent levels according to the information 704 provided by the decision-making unit 702. The control instruction 516 is generated to control intelligent display module 506 to enhance safety control of the connected automated vehicle in various special scenarios. The route selection unit 703 determines the mobile path 514 according to the deployment task of the RUMC 513 and the mobile scheme 608 provided by the intelligent computing module 502. The intelligent decision control module 503 judges whether the planned path 514 can meet the service task assigned by the RUMC in conjunction with the movement status information of the MRIU 515, which is returned by the intelligent mobile module 505.

Figure 8:
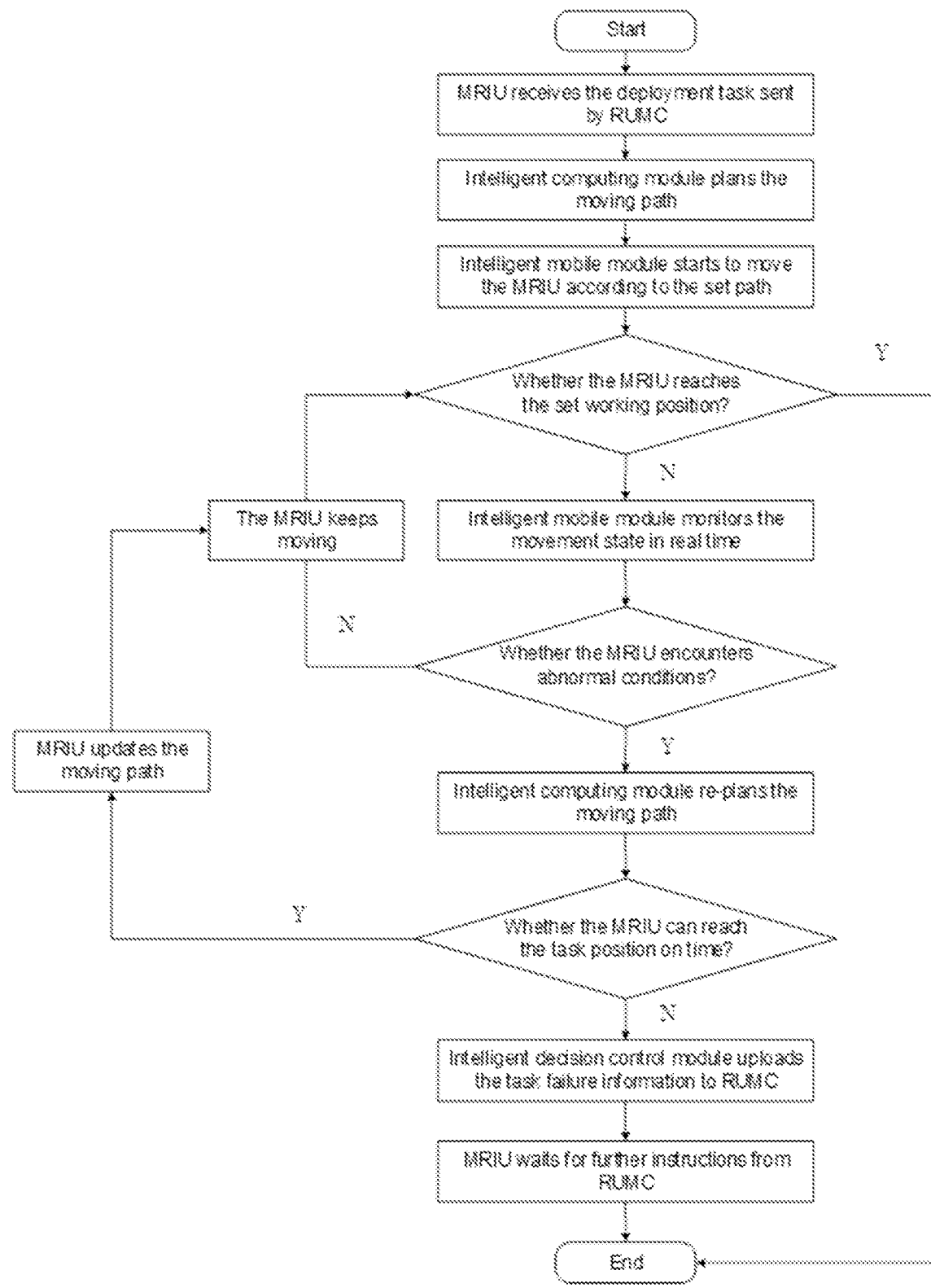
FIG. 8 is a flow chart of an exemplary method performed by the MRIU during the movement process.

In some embodiments, e.g., as shown in FIG. 8, the technology provides a method for moving MRIU. The intelligent communication module receives a deployment command from the RUMC. The intelligent computing module plans the moving path and the moving speed by combining the prediction information and attribute information of the MRIU. The intelligent decision control module selects and confirms the moving path and sends the information to the intelligent mobile module. The intelligent mobile module moves the MRIU according to the preset moving path and moving speed, and the intelligent mobile module monitors the movement status of MRIU in real-time. If the intelligent sensing module detects obstacles in the path of the MRIU or the intelligent mobile module detects abnormal conditions, the intelligent computing module re-plans the MRIU moving path based on real-time environment information and parameter information of the MRIU. If the intelligent decision control module determines that the MRIU cannot reach the task location on time using the new planning path, the intelligent decision control module will upload the task failure information to the RUMC, and the MRIU will wait for further instructions from the RUMC. Alternatively, if the intelligent decision control module determines that the MRIU can reach the task location on time using the new planning path, the intelligent mobile module will move the MRIU according to the updated path.

Figure 9:
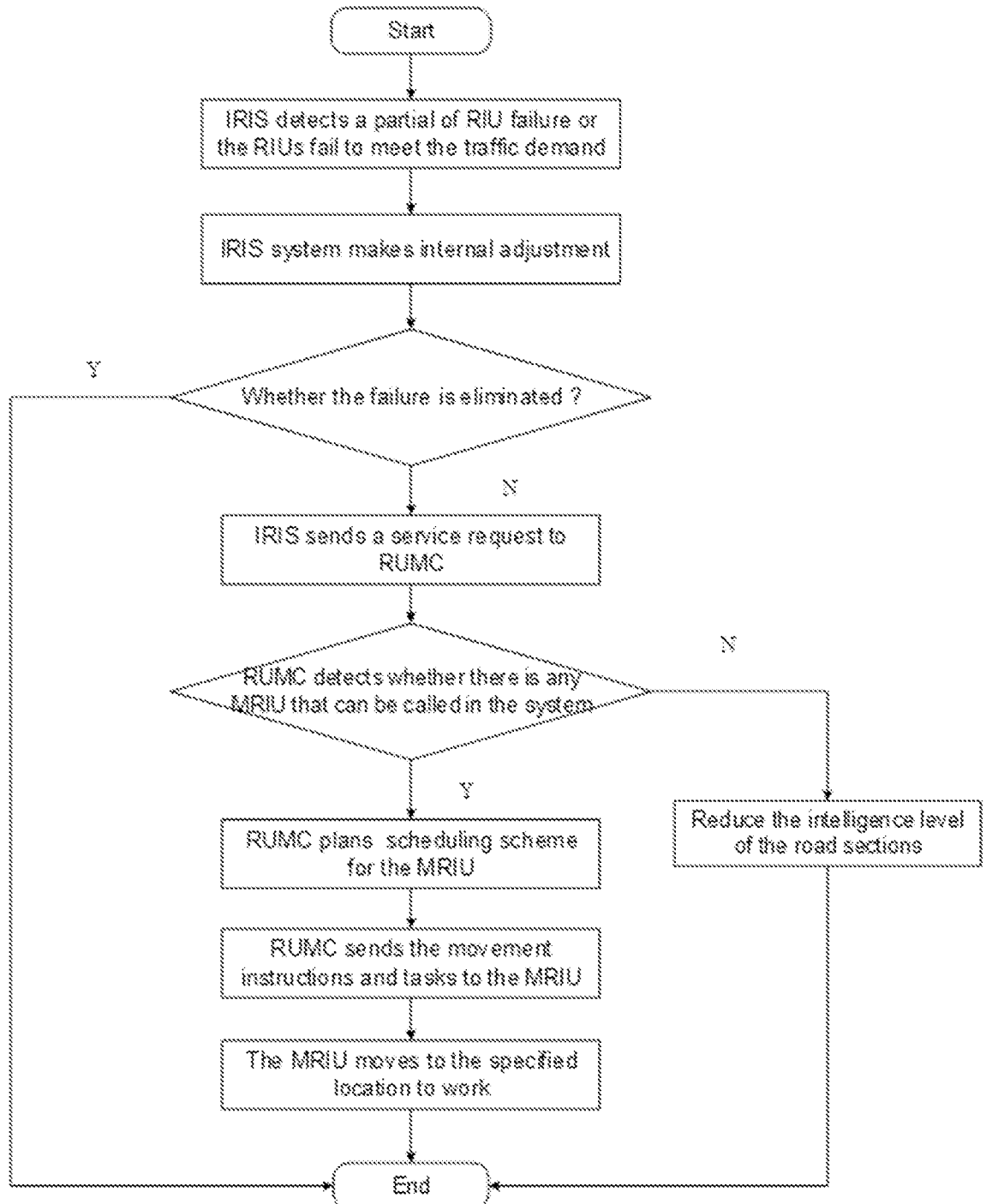
FIG. 9 is a flow chart of an exemplary management control method performed by the MRIU to assist RIU of the IRIS, e.g., to assist a malfunctioning RIU of the IRIS or to assist an RIU that is unable to provide services to meet the requirements of the automated driving function.

In some embodiments, e.g., as shown in FIG. 9, the technology provides methods for a management control method for MRIU when the RIUs of the IRIS malfunction, cease to function, or the RIUs are unable to meet the requirements of the automated driving function. When the IRIS detects partial RIU failure or that an RIU fails to meet the traffic demand, the IRIS makes internal adjustments. If the failure cannot be eliminated and/or addressed by IRIS, the IRIS sends a service request to the RUMC. Next, the RUMC detects whether there are MRIUs that can be callable in the system (e.g., provided to the IRIS). If there are MRIUs that can be called in the system (e.g., provided to the IRIS), the RUMC plans a MRIU scheduling scheme and sends moving instructions and work tasks to the selected MRIUs. Finally, the MRIUs move to the specified location and perform automatic driving tasks in cooperation with the RIU. If there are no MRIUs that can be called in the system (e.g., provided to IRIS), the intelligence level of this area is reduced.

Figure 10:
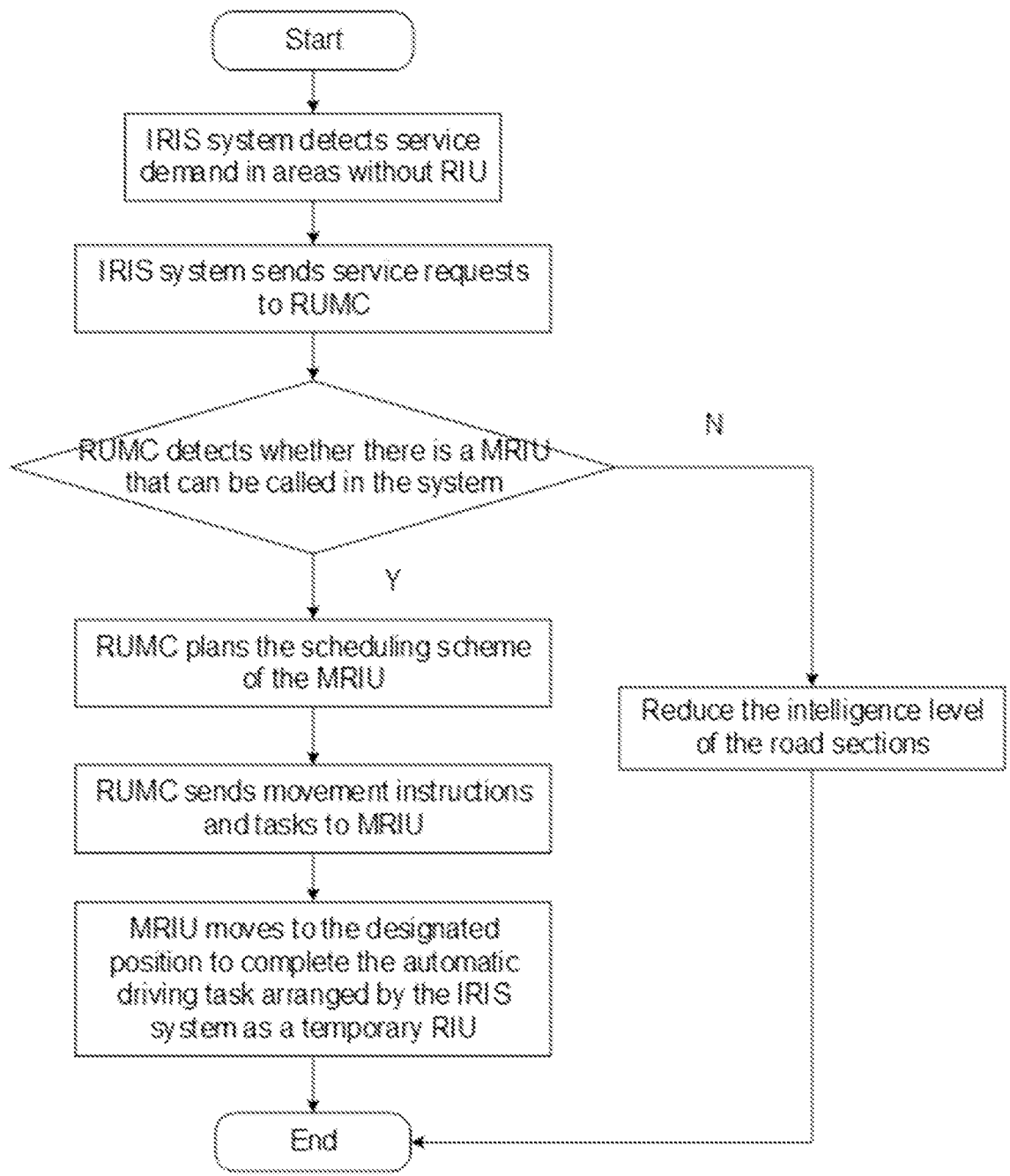
FIG. 10 is a flow chart of an exemplary management control method performed by the MRIU to assist an IRIS in an area without a RIU.

In some embodiments, e.g., as shown in FIG. 10, the technology provides a management control method for MRIU when the IRIS has no RIUs in certain locations. As shown in FIG. 10, after the IRIS detects service demands in an area without RIUs, IRIS sends a service request to the RUMC. The RUMC detects if there are MRIUs available. If there are MRIUs available, the RUMC plans the scheduling scheme of the MRIU and sends movement instructions and tasks to the MRIU. Then, the MRIU moves to the designated position to complete the automatic driving task arranged by the IRIS (e.g., the MRIU acts as a temporary RIU). If there is no MRIU available in the system, the intelligence level of this area is reduced.

Figure 11:
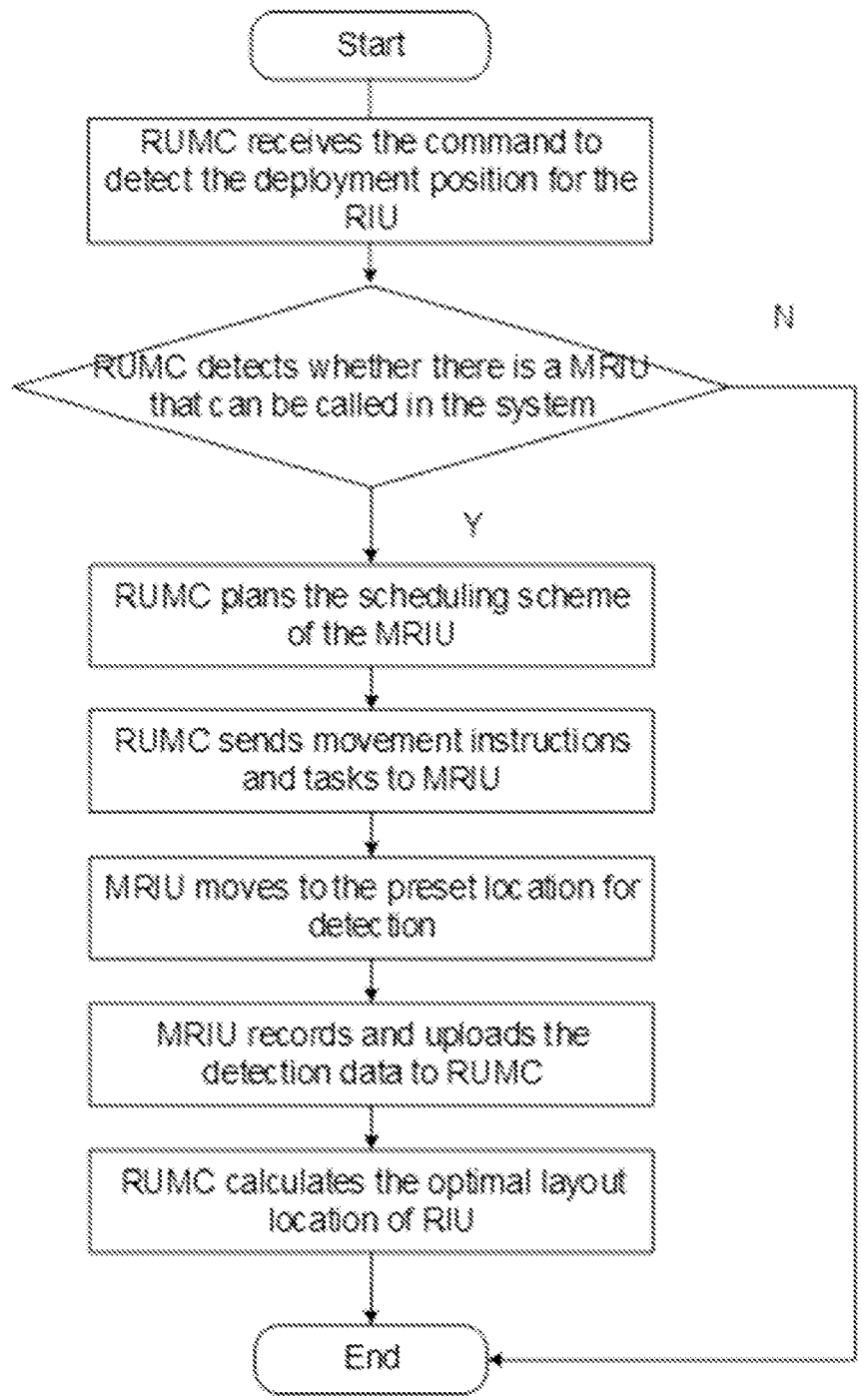
FIG. 11 is a flow chart of an exemplary management control method perform by the MRIU to detect the layout location of RIU for a system without IRIS.

In some embodiments, e.g., as shown in FIG. 11, the technology provides a management control method for the MRIU to improve the layout of RIUs for the IRIS (e.g., to supplement the coverage of a road network by RIU and/or MRIU). As shown in FIG. 11, after the RUMC receives a command to detect the deployment position of RIU, the RUMC will detect whether there are MRIUs that can be used to collect the detection performance data. If there are MRIUs available, the RUMC plans the scheduling scheme of the MRIU and sends movement instructions and tasks to the MRIU. Then, the MRIU moves to the pre-set location for detection and uploads the detection data to the RUMC. Finally, the RUMC calculates the optimal location of the RIU.

Automated Driving Systems (ADS)

In some embodiments, the technology provides improvements (e.g., a MIRIS) for a vehicle operations and control system (e.g., an ADS and technologies as described herein). In some embodiments, the ADS comprises one or more of a roadside intelligent unit (RIU) network; a Traffic Control Unit (TCU), a Traffic Control Center (TCC); a TCU/TCC network; a vehicle intelligent unit (VIU) (e.g., a vehicle comprising a VIU); and/or a Traffic Operations Center (TOC). In some embodiments, the system comprises multiple kinds of sensors and computation devices on CAV and infrastructure (e.g., roadside infrastructure) and is configured to integrate sensing, prediction, planning, and control for automated driving of CAV.

In some embodiments, the technology relates to an ADS provided as a connected and automated vehicle highway (CAVH) system, e.g., comprising one or more components of an intelligent road infrastructure system (see, e.g., U.S. Pat. Nos. 10,867,512 and 10,380,886, each of which is incorporated herein by reference). In some embodiments, the ADS is provided as or supports a distributed driving system (DDS), intelligent roadside toolbox (IRT), and/or device allocation system (DAS) (see, e.g., U.S. patent application Ser. Nos. 16/996,684; 63/004,551; and 63/004,564, each of which is incorporated herein by reference). In some embodiments, the term "roadside intelligent unit" and its abbreviation "RIU" are used to refer to the components named a "roadside unit" and its abbreviation "RSU", respectively, as described for the CAVH technology in, e.g., U.S. Pat. Nos. 10,867,512 and 10,380,886, each of which is incorporated herein by reference. In some embodiments, the term "vehicle intelligent unit" and its abbreviation "VIU" are used to refer to the components named an "onboard unit" and its abbreviation "OBU", respectively, as described for the CAVH technology in, e.g., U.S. Pat. Nos. 10,867,512 and 10,380,886, each of which is incorporated herein by reference. In some embodiments, the term "vehicle intelligent unit" and its abbreviation "VIU" are used to refer to the components named an "onboard intelligent unit" and its abbreviation "OIU", respectively, as described in U.S. Pat. App. Ser. No. 63/042,620, incorporated herein by reference.

In some embodiments, the technology provides a system (e.g., a vehicle operations and control system comprising a RIU and/or an RIU network; a TCU/TCC network; a vehicle comprising an vehicle intelligent unit; a TOC; and/or a cloud-based platform configured to provide information and computing services (see, e.g., U.S. patent application Ser. No. 16/454,268, incorporated herein by reference)) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RIU network comprises an RIU subsystem. In some embodiments, the RIU network comprises one or more MRIU as described herein. In some embodiments, the RIU subsystem comprises a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, the communication module communicates using wired or wireless media.

In some embodiments, the sensing module comprises a radar based sensor. In some embodiments, the sensing module comprises a vision based sensor. In some embodiments, the sensing module comprises a radar based sensor and a vision based sensor and wherein the vision based sensor and the radar based sensor are configured to sense the driving environment and vehicle attribute data. In some embodiments, the radar based sensor is a LIDAR, microwave radar, ultrasonic radar, or millimeter radar. In some embodiments, the vision based sensor is a camera, infrared camera, or thermal camera. In some embodiments, the camera is a color camera.

In some embodiments, the sensing module comprises a global navigation satellite system (GNSS). In some embodiments, the sensing module comprises an inertial navigation system. In some embodiments, the sensing module comprises a satellite based navigation system and an inertial navigation system and the sensing module and/or the inertial navigation system are configured to provide vehicle location data. In some embodiments, the GNSS is, e.g., the Global Positioning System developed by the United States, Differential Global Positioning System (DGPS), BeiDou Navigation Satellite System (BDS) System, GLONASS Global Navigation Satellite System), European Union Galileo positioning system, the NavIC system of India, and the Quasi-Zenith Satellite System (QZSS) of Japan.

In some embodiments, the sensing module comprises a vehicle identification device. In some embodiments, the vehicle identification device comprises RFID, Bluetooth, Wi-fi (IEEE 802.11), or a cellular network radio, e.g., a 4G, 5G, 6G, or 7G cellular network radio.

In some embodiments, the RIU subsystem comprises RIU deployed on a mobile component, e.g., to provide a MRIU as described herein. In some embodiments, the RIU subsystem comprises RIU (e.g., MRIU) deployed on a wheeled vehicle. In some embodiments, the RIU subsystem comprises RIU (e.g., MRIU) deployed on a vehicle drone over a critical location, on an unmanned aerial vehicle (UAV), at a site of traffic congestion, at a site of a traffic accident, at a site of highway construction, and/or at a site of extreme weather.

In some embodiments, the RIU subsystem comprises a MRIU comprising a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, the communication module communicates using wired or wireless media.

In some embodiments, the MRIU comprises a sensing module comprising a radar based sensor. In some embodiments, the sensing module comprises a vision based sensor. In some embodiments, the sensing module comprises a radar based sensor and a vision based sensor and wherein the vision based sensor and the radar based sensor are configured to sense the driving environment and vehicle attribute data. In some embodiments, the radar based sensor is a LIDAR, microwave radar, ultrasonic radar, or millimeter radar. In some embodiments, the vision based sensor is a camera, infrared camera, or thermal camera. In some embodiments, the camera is a color camera.

In some embodiments, the MRIU sensing module comprises a global navigation satellite system (GNSS). In some embodiments, the sensing module comprises an inertial navigation system. In some embodiments, the sensing module comprises a satellite based navigation system and an inertial navigation system and the sensing module and/or the inertial navigation system are configured to provide vehicle location data. In some embodiments, the GNSS is, e.g., the Global Positioning System developed by the United States, Differential Global Positioning System (DGPS), BeiDou Navigation Satellite System (BDS) System, GLONASS Global Navigation Satellite System), European Union Galileo positioning system, the NavIC system of India, and the Quasi-Zenith Satellite System (QZSS) of Japan.

In some embodiments, the MRIU sensing module comprises a vehicle identification device. In some embodiments, the vehicle identification device comprises RFID, Bluetooth, Wi-fi (IEEE 802.11), or a cellular network radio, e.g., a 4G, 5G, 6G, or 7G cellular network radio.

In some embodiments, the RIU subsystem comprises RIU deployed at a fixed location near a road comprising automated lanes and, optionally, human-driven lanes. In some embodiments, the RIU subsystem comprises RIU deployed at a fixed location near road infrastructure. In some embodiments, the RIU subsystem comprises RIU deployed near a highway roadside, a highway onramp, a highway offramp, an interchange, intersection, a bridge, a tunnel, a toll station, or on a drone over a critical location. In some embodiments, an RIU subsystem comprises RIU positioned according to road geometry, traffic amount, traffic capacity, vehicle type using a road, road size, and/or geography of the area. In some embodiments, the RIU subsystem comprises RIU installed on a gantry (e.g., an overhead assembly, e.g., on which highway signs or signals are mounted). In some embodiments, the RIU subsystem comprises RIU installed using a single cantilever or dual cantilever support.

In some embodiments, the TCC network is configured to provide traffic operation optimization, data processing, and archiving. In some embodiments, the TCC network comprises a human operations interface. In some embodiments, the TCC network is a macroscopic TCC, a regional TCC, or a corridor TCC based on the geographical area covered by the TCC network. See, e.g., U.S. Pat. Nos. 10,380,886; 10,867,512; 10,692,365; and U.S. Pat. App. Pub. Nos. 20200005633 and 20200021961, each of which is incorporated herein by reference.

In some embodiments, the TCU network is configured to provide real-time vehicle control and data processing. In some embodiments, the real-time vehicle control and data processing are automated based on preinstalled algorithms. In some embodiments, the TCU network comprises a segment TCU or a point TCU based on based on the geographical area covered by the TCU network. In some embodiments, the system comprises a point TCU physically combined or integrated with an RIU. In some embodiments, the system comprises a segment TCU physically combined or integrated with a RIU. See, e.g., U.S. Pat. Nos. 10,380,886; 10,867,512; 10,692,365; and U.S. Pat. App. Pub. Nos. 20200005633 and 20200021961, each of which is incorporated herein by reference.

In some embodiments, the TCC network comprises macroscopic TCCs configured to process information from regional TCCs and provide control targets to regional TCCs; regional TCCs configured to process information from corridor TCCs and provide control targets to corridor TCCs; and corridor TCCs configured to process information from macroscopic and segment TCUs and provide control targets to segment TCUs. See, e.g., U.S. Pat. Nos. 10,380,886; 10,867,512; 10,692,365; and U.S. Pat. App. Pub. Nos. 20200005633 and 20200021961, each of which is incorporated herein by reference.

In some embodiments, the TCU network comprises segment TCUs configured to process information from corridor and/or point TOCs and provide control targets to point TCUs; and point TCUs configured to process information from the segment TCU and RIUs and provide vehicle-based control instructions (e.g., detailed and time-sensitive control instructions for individual vehicles) to an RIU. See, e.g., U.S. Pat. Nos. 10,380,886; 10,867,512; 10,692,365; and U.S. Pat. App. Pub. Nos. 20200005633 and 20200021961, each of which is incorporated herein by reference.

In some embodiments, the RIU network provides vehicles with customized traffic information and control instructions (e.g., detailed and time-sensitive control instructions for individual vehicles) and receives information provided by vehicles.

In some embodiments, the TCC network comprises one or more TCCs comprising a connection and data exchange module configured to provide data connection and exchange between TCCs. In some embodiments, the connection and data exchange module comprises a software component providing data rectify, data format convert, firewall, encryption, and decryption methods. In some embodiments, the TCC network comprises one or more TCCs comprising a transmission and network module configured to provide communication methods for data exchange between TCCs. In some embodiments, the transmission and network module comprises a software component providing an access function and data conversion between different transmission networks within the cloud platform. In some embodiments, the TCC network comprises one or more TCCs comprising a service management module configured to provide data storage, data searching, data analysis, information security, privacy protection, and network management functions. In some embodiments, the TCC network comprises one or more TCCs comprising an application module configured to provide management and control of the TCC network. In some embodiments, the application module is configured to manage cooperative control of vehicles and roads, system monitoring, emergency services, and human and device interaction.

In some embodiments, TCU network comprises one or more TCUs comprising a sensor and control module configured to provide the sensing and control functions of an RIU. In some embodiments, the sensor and control module is configured to provide the sensing and control functions of radar, camera, RFID, and/or V2I (vehicle-to-infrastructure) equipment. In some embodiments, the sensor and control module comprises a DSRC, GPS, 4G, 5G, 6G, 7G, and/or wireless (e.g., IEEE 802.11) radio. In some embodiments, the TCU network comprises one or more TCUs comprising a transmission and network module configured to provide communication network function for data exchange between an automated vehicle and a RIU. In some embodiments, the TCU network comprises one or more TCUs comprising a service management module configured to provide data storage, data searching, data analysis, information security, privacy protection, and network management. In some embodiments, the TCU network comprises one or more TCUs comprising an application module configured to provide management and control methods of an RIU. In some embodiments, the management and control methods of an RIU comprise local cooperative control of vehicles and roads, system monitoring, and emergency service. In some embodiments, the TCC network comprises one or more TCCs further comprising an application module and the service management module provides data analysis for the application module. In some embodiments, the TCU network comprises one or more TCUs further comprising an application module and the service management module provides data analysis for the application module.

In some embodiments, the TOC comprises interactive interfaces. In some embodiments, the interactive interfaces provide control of the TCC network and data exchange. In some embodiments, the interactive interfaces comprise information sharing interfaces and vehicle control interfaces. In some embodiments, the information sharing interfaces comprise an interface that shares and obtains traffic data; an interface that shares and obtains traffic incidents; an interface that shares and obtains passenger demand patterns from shared mobility systems; an interface that dynamically adjusts prices according to instructions given by the vehicle operations and control system; and/or an interface that allows a special agency (e.g., a vehicle administrative office or police) to delete, change, and/or share information. In some embodiments, the vehicle control interfaces comprise an interface that allows a vehicle operations and control system to assume control of vehicles; an interface that allows vehicles to form a platoon with other vehicles; and/or an interface that allows a special agency (e.g., a vehicle administrative office or police) to assume control of a vehicle. In some embodiments, the traffic data comprises vehicle density, vehicle velocity, and/or vehicle trajectory. In some embodiments, the traffic data is provided by the vehicle operations and control system and/or other shared mobility systems. In some embodiments, traffic incidents comprise extreme conditions, major and/or minor accident, and/or a natural disaster. In some embodiments, an interface allows the vehicle operations and control system to assume control of vehicles upon occurrence of a traffic event, extreme weather, or pavement breakdown when alerted by the vehicle operations and control system and/or other shared mobility systems. In some embodiments, an interface allows vehicles to form a platoon with other vehicles when they are driving in the same automated vehicle dedicated lane.

In some embodiments, the VIU comprises a communication module configured to communicate with an RIU and/or MRIU. In some embodiments, the VIU comprises a communication module configured to communicate with another VIU. In some embodiments, the VIU comprises a data collection module configured to collect data from external vehicle sensors and internal vehicle sensors; and to monitor vehicle status and driver status. In some embodiments, the VIU comprises a vehicle control module configured to execute control instructions for driving tasks. In some embodiments, the driving tasks comprise car following and/or lane changing. In some embodiments, the control instructions are received from an RIU and/or MRIU. In some embodiments, the VIU is configured to control a vehicle using data received from an RIU and/or MRIU. In some embodiments, the data received from the RIU comprises vehicle control instructions (e.g., detailed and time-sensitive control instructions for individual vehicles); travel route and traffic information; and/or services information. In some embodiments, the vehicle control instructions comprise a longitudinal acceleration rate, a lateral acceleration rate, and/or a vehicle orientation. In some embodiments, the travel route and traffic information comprise traffic conditions, incident location, intersection location, entrance location, and/or exit location. In some embodiments, the services data comprises the location of a fuel station and/or location of a point of interest. In some embodiments, a VIU is configured to send data to an RIU and/or MRIU. In some embodiments, the data sent to the RIU and/or MRIU comprises driver input data; driver condition data; and/or vehicle condition data. In some embodiments, the driver input data comprises origin of the trip, destination of the trip, expected travel time, and/or service requests. In some embodiments, the driver condition data comprises driver behaviors, fatigue level, and/or driver distractions. In some embodiments, the vehicle condition data comprises vehicle ID, vehicle type, and/or data collected by a data collection module.

In some embodiments, the VIU is configured to collect data comprising vehicle engine status; vehicle speed; surrounding objects detected by vehicles; and/or driver conditions. In some embodiments, the VIU is configured to assume control of a vehicle. In some embodiments, the VIU is configured to assume control of a vehicle when the automated driving system fails. In some embodiments, the VIU is configured to assume control of a vehicle when the vehicle condition and/or traffic condition prevents the automated driving system from driving the vehicle. In some embodiments, the vehicle condition and/or traffic condition is adverse weather conditions, a traffic incident, a system failure, and/or a communication failure.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A Mobile Intelligent Road Infrastructure System (MIRIS) comprising the following physical subsystems: a Mobile Roadside Intelligent Unit (MRIU); and a Roadside Unit Management Control (RUMC) system configured to identify optimal MRIU deployment locations and deploy MRIU to said deployment locations.

2. The MIRIS of claim 1 configured to support an automated driving system (ADS) by providing one or more mobile roadside intelligent units (MRIU) to said ADS.

3. The MIRIS of claim 2, wherein said ADS is a road-based ADS, a connected and automated vehicle (CAV)-based ADS, a cloud-based ADS, and/or a high precision map-based ADS.

4. The MIRIS of claim 1, wherein said MIRIS is supported by a multi-level cloud platform.

5. The MIRIS of claim 1 configured to serve automated vehicles (AV) and/or connected and automated vehicles (CAV) having an intelligence level of V1, V1.5, V2, V3, V4, and/or V5.

6. The MIRIS of claim 1 configured to receive data from a Vehicle Intelligent Unit (VIU) and/or an MRIU, generate vehicle control instructions, and/or send vehicle control instructions to a VIU.

7. The MIRIS of claim 1 configured to complement, enhance, back-up, elevate, provide, and/or replace automated driving functions provided by an ADS, wherein said automated driving functions are sensing, prediction, decision-making, and vehicle control.

8. The MIRIS of claim 1, further comprising a Traffic Operation Center (TOC), wherein said TOC is configured to provide vehicle control and traffic management strategies, adjust a position of an MRIU, and/or provide automated driving functions through said RUMC system.

9. The MIRIS of claim 1, wherein said RUMC system comprises an information transmission subsystem, a data management subsystem, a mobile service subsystem, and/or a security control subsystem.

10. The MIRIS of claim 9, wherein said RUMC system is configured to:
   a) receive, by the information transmission subsystem, a service request sent by an Intelligent Road Infrastructure System (IRIS) or the MRIU;
   b) back up, by the data management subsystem, the service request;
   c) analyze, by the mobile service subsystem, a specific working scenario of the service request;
   d) determine, by the mobile service subsystem, if the MIRIS can provide services in the specific working scenario; and
   e) perform either (i) or (ii):
      i) if the MIRIS cannot provide services in the specific working scenario: generate, by the mobile service subsystem, a command that the MIRIS cannot provide services in the specific working scenario; transmit the command to the information transmission subsystem; and send, by the information transmission subsystem, the command to the IRIS and/or to the MRIU indicating that the MIRIS cannot provide services in the specific working scenario; or
      ii) if the MIRIS can provide services in the specific working scenario: select, by the mobile service subsystem, work modules for providing services in the specific working scenario; generate a layout scheme and MRIU control instructions; confirm, by the security control subsystem, the layout scheme and MRIU control instructions; and send, by the information transmission subsystem, the layout scheme and MRIU control instructions to the IRIS and/or to the MRIU.

11. The MIRIS of claim 9, wherein the mobile service subsystem comprises a dynamic deployment module configured to adjust a location of the MRIU to balance ADS services and demands for the ADS services.

12. The MIRIS of claim 1, wherein said MRIU comprises an intelligent sensing module; an intelligent communication module; an intelligent computing module; an intelligent decision control module; an intelligent mobile module; and/or an intelligent display module.

13. The MIRIS of claim 12, wherein the MRIU is configured to:
   a) receive, by the intelligent communication module, a deployment command from the RUMC;
   b) plan, by the intelligent computing module, a moving path and/or a moving speed for the MRIU;
   c) select, by the intelligent decision control module, a moving path and/or a moving speed and sending the moving path and/or the moving speed to an intelligent mobile module;
   d) move, by the intelligent mobile module, the MRIU according to the moving path and/or the moving speed; and
   e) monitor, by the intelligent mobile module, the movement status of the MRIU.

14. The MIRIS of claim 1, further comprising one or more of the following physical subsystems:
   a Traffic Operation Center (TOC);
   a Traffic Control Center (TCC) and Traffic Control Unit (TCU); and/or
   a roadside communication system.

* * * * *